(12) United States Patent
Bassett

(10) Patent No.: US 9,167,740 B2
(45) Date of Patent: Oct. 27, 2015

(54) ROW UNIT FOR AGRICULTURAL IMPLEMENT

(71) Applicant: Dawn Equipment Company, Sycamore, IL (US)

(72) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 167 days.

(21) Appl. No.: 13/890,373

(22) Filed: May 9, 2013

(65) Prior Publication Data

US 2013/0264078 A1   Oct. 10, 2013

Related U.S. Application Data

(63) Continuation of application No. 13/075,574, filed on Mar. 30, 2011, now Pat. No. 8,544,398, which is a continuation-in-part of application No. 12/882,627, filed on Sep. 15, 2010, now Pat. No. 8,544,397.

(51) Int. Cl.
*A01B 61/04* (2006.01)
*A01C 7/20* (2006.01)

(52) U.S. Cl.
CPC ............. *A01B 61/046* (2013.01); *A01C 7/205* (2013.01)

(58) Field of Classification Search
CPC .... A01B 63/144; A01B 63/111; A01B 63/10;
A01B 63/02; A01B 63/00; A01B 63/32;
A01B 63/24; A01B 63/22; A01B 63/16;
A01B 63/008; A01B 61/046; A01B 61/044;
A01B 61/04; A01B 61/00; A01B 33/087;
A01B 33/08; A01B 33/00; A01B 33/024;
A01B 79/005; A01B 79/02; A01C 7/203;
A01C 7/205; A01C 7/201; A01C 7/208;
A01C 7/00; E02F 9/2029; E02F 9/2033;
E02F 9/2037; E02F 9/2025; E02F 9/20;
E02F 9/00; E02F 9/2271; E02F 9/2264;
E02F 9/2257; E02F 9/2221; E02F 9/2217;
E02F 9/2207; E02F 9/2203; E02F 9/22;
E02F 5/027; E02F 5/02; E02F 5/00

USPC .......... 172/4, 2, 413; 111/135, 139–143, 157,
111/163–169, 190–196, 200, 900, 927;
701/50

See application file for complete search history.

(56) References Cited

U.S. PATENT DOCUMENTS

| 114,002 | A | 4/1871 | Godfrey |
| 353,491 | A | 2/1886 | Wells |

(Continued)

FOREIGN PATENT DOCUMENTS

| BE | 551372 | 10/1956 |
| CA | 530673 | 9/1956 |

(Continued)

OTHER PUBLICATIONS

John Deere, Seat Catalog, date estimated as early Sep. 2011 (19 pages).

(Continued)

*Primary Examiner* — Christopher J Novosad
(74) *Attorney, Agent, or Firm* — Nixon Peabody LLP

(57) ABSTRACT

In one embodiment, an agricultural row unit for use with a towing frame hitched to a tractor includes an attachment frame adapted to be rigidly connected to the towing frame. A support member is pivotably coupled to the attachment frame to permit vertical pivoting movement of the support member relative to the attachment frame, and at least one furrow-closing device is mounted on the support member. A hydraulic cylinder is coupled to the support member for urging the row unit frame downwardly toward the soil. The hydraulic cylinder includes a movable ram extending into the cylinder, and a hydraulic-fluid cavity within the cylinder for receiving pressurized hydraulic fluid for urging the ram in a first direction that pivots the support member in a first vertical direction. An accumulator has a fluid chamber containing a pressurized gas for urging the ram in a second direction that pivots the support member in a second vertical direction.

20 Claims, 13 Drawing Sheets

(56) References Cited

U.S. PATENT DOCUMENTS

| | | | |
|---|---|---|---|
| 523,508 A | 7/1894 | Bauer et al. | |
| 736,369 A | 8/1903 | Dynes et al. | |
| 803,088 A | 10/1905 | Barker | |
| 1,134,462 A | 4/1915 | Kendrick | |
| 1,158,023 A | 10/1915 | Beaver | |
| 1,247,744 A | 11/1917 | Trimble | |
| 1,260,752 A | 3/1918 | Casaday | |
| 1,321,040 A | 11/1919 | Hoffman | |
| 1,391,593 A | 9/1921 | Sweeting | |
| 1,398,668 A | 11/1921 | Bordsen | |
| 1,481,981 A | 1/1924 | Boye | |
| 1,791,462 A | 2/1931 | Bermel | |
| 1,901,299 A | 3/1933 | Johnson | |
| 1,901,778 A | 3/1933 | Schlag | |
| 2,014,334 A | 9/1935 | Johnson | |
| 2,058,539 A | 10/1936 | Welty et al. | |
| 2,269,051 A | 1/1942 | Cahoy | |
| 2,341,143 A | 2/1944 | Herr | |
| 2,505,276 A | 4/1950 | Boroski | |
| 2,561,763 A | 7/1951 | Waters et al. | |
| 2,593,176 A | 4/1952 | Patterson | |
| 2,611,306 A | 9/1952 | Strehlow et al. | |
| 2,612,827 A | 10/1952 | Baggette et al. | |
| 2,691,353 A | 10/1954 | Secondo | |
| 2,692,544 A | 10/1954 | Jessup | |
| 2,715,286 A | 8/1955 | Saveson | |
| 2,754,622 A | 7/1956 | Rohnert | |
| 2,771,044 A | 11/1956 | Putifer | |
| 2,773,343 A | 12/1956 | Oppel | |
| 2,777,373 A | 1/1957 | Pursche | |
| 2,799,234 A | 7/1957 | Chancey | |
| 2,805,574 A | 9/1957 | Jackson, Jr. et al. | |
| 2,925,872 A | 2/1960 | Darnell | |
| 2,960,358 A | 11/1960 | Christison | |
| 3,010,744 A | 11/1961 | Hollis | |
| 3,014,547 A | 12/1961 | Van der Lely | |
| 3,038,424 A | 6/1962 | Johnson | |
| 3,042,121 A | 7/1962 | Broetzman et al. | |
| 3,057,092 A | 10/1962 | Curlett | |
| 3,058,243 A | 10/1962 | McGee | |
| 3,065,879 A | 11/1962 | Jennings et al. | |
| 3,110,973 A | 11/1963 | Reynolds | |
| 3,122,901 A | 3/1964 | Thompson | |
| 3,123,152 A | 3/1964 | Biskis | |
| 3,188,989 A | 6/1965 | Johnston | |
| 3,213,514 A | 10/1965 | Evans | |
| 3,250,109 A | 5/1966 | Spyridakis | |
| 3,314,278 A | 4/1967 | Bergman | |
| 3,319,589 A | 5/1967 | Moran | |
| 3,351,139 A | 11/1967 | Schmitz et al. | |
| 3,355,930 A | 12/1967 | Fedorov | |
| 3,370,450 A | 2/1968 | Scheucher | |
| 3,420,273 A | 1/1969 | Greer | |
| 3,447,495 A | 6/1969 | Miller et al. | |
| 3,539,020 A | 11/1970 | Andersson et al. | 74/527 |
| 3,543,603 A | 12/1970 | Gley | 74/529 |
| 3,561,541 A | 2/1971 | Woelfel | 172/265 |
| 3,576,098 A | 4/1971 | Brewer | 56/295 |
| 3,581,685 A | 6/1971 | Taylor | 111/7 |
| 3,593,720 A | 7/1971 | Botterill et al. | 130/27 |
| 3,606,745 A | 9/1971 | Girodat | 56/20 |
| 3,635,495 A | 1/1972 | Orendorff | 280/415 |
| 3,653,446 A | 4/1972 | Kalmon | 172/4 |
| 3,701,327 A | 10/1972 | Krumholz | 111/81 |
| 3,708,019 A | 1/1973 | Ryan | 172/470 |
| 3,711,974 A | 1/1973 | Webb | 40/63 |
| 3,718,191 A | 2/1973 | Williams | 172/196 |
| 3,749,035 A | 7/1973 | Cayton et al. | 111/85 |
| 3,753,341 A | 8/1973 | Berg, Jr. et al. | 56/400.04 |
| 3,766,988 A | 10/1973 | Whitesides | 172/548 |
| 3,774,446 A | 11/1973 | Diehl | 73/194 |
| 3,906,814 A | 9/1975 | Magnussen | 74/483 PB |
| 3,939,846 A | 2/1976 | Drozhzhin et al. | 130/27 |
| 3,945,532 A | 3/1976 | Marks | 222/55 |
| 3,975,890 A | 8/1976 | Rodger | 56/208 |
| 4,009,668 A | 3/1977 | Brass et al. | 111/85 |
| 4,018,101 A | 4/1977 | Mihalic | 74/493 |
| 4,044,697 A | 8/1977 | Swanson | 111/66 |
| 4,055,126 A | 10/1977 | Brown et al. | 111/85 |
| 4,058,171 A | 11/1977 | van der Lely | 172/713 |
| 4,063,597 A | 12/1977 | Day | 172/126 |
| 4,096,730 A | 6/1978 | Martin | 72/352 |
| 4,099,576 A | 7/1978 | Jilani | 172/555 |
| 4,122,715 A | 10/1978 | Yokoyama et al. | 73/228 |
| 4,129,082 A | 12/1978 | Betulius | 111/7 |
| 4,141,200 A | 2/1979 | Johnson | 56/10.2 |
| 4,141,302 A | 2/1979 | Morrison, Jr. et al. | 111/52 |
| 4,141,676 A | 2/1979 | Jannen et al. | 417/539 |
| 4,142,589 A | 3/1979 | Schlagenhauf | 172/510 |
| 4,147,305 A | 4/1979 | Hunt | 239/167 |
| 4,149,475 A | 4/1979 | Bailey et al. | 111/66 |
| 4,157,661 A | 6/1979 | Schindel | 73/228 |
| 4,161,090 A | 7/1979 | Watts, Jr. | 52/301 |
| 4,173,259 A | 11/1979 | Heckenkamp | 172/10 |
| 4,182,099 A | 1/1980 | Davis et al. | 56/16.4 |
| 4,187,916 A | 2/1980 | Harden et al. | 172/146 |
| 4,191,262 A | 3/1980 | Sylvester | 172/459 |
| 4,196,567 A | 4/1980 | Davis et al. | 56/13.7 |
| 4,196,917 A | 4/1980 | Oakes et al. | 280/463 |
| 4,206,817 A | 6/1980 | Bowerman | 172/559 |
| 4,208,974 A | 6/1980 | Dreyer et al. | 111/85 |
| 4,213,408 A | 7/1980 | West et al. | 111/85 |
| 4,225,191 A | 9/1980 | Knoski | 301/9 |
| 4,233,803 A | 11/1980 | Davis et al. | 56/14.9 |
| 4,241,674 A | 12/1980 | Mellinger | 111/52 |
| 4,280,419 A | 7/1981 | Fischer | 111/80 |
| 4,295,532 A | 10/1981 | Williams et al. | 172/184 |
| 4,301,870 A | 11/1981 | Carre et al. | 172/7 |
| 4,307,674 A | 12/1981 | Jennings et al. | 111/85 |
| 4,311,104 A | 1/1982 | Steilen et al. | 111/85 |
| 4,317,355 A | 3/1982 | Hatsuno et al. | 72/342 |
| 4,359,101 A | 11/1982 | Gagnon | 172/38 |
| 4,375,837 A | 3/1983 | van der Lely et al. | 172/68 |
| 4,377,979 A | 3/1983 | Peterson et al. | 111/52 |
| 4,407,371 A | 10/1983 | Hohl | 172/253 |
| 4,430,952 A | 2/1984 | Murray | 111/85 |
| 4,433,568 A | 2/1984 | Kondo | 72/356 |
| 4,438,710 A | 3/1984 | Paladino | 111/3 |
| 4,445,445 A | 5/1984 | Sterrett | 111/7 |
| 4,461,355 A | 7/1984 | Peterson et al. | 172/156 |
| 4,481,830 A | 11/1984 | Smith et al. | 73/861.71 |
| 4,499,775 A | 2/1985 | Lasoen | 73/862.57 |
| 4,506,610 A | 3/1985 | Neal | 111/87 |
| 4,508,178 A | 4/1985 | Cowell et al. | 172/239 |
| 4,528,920 A | 7/1985 | Neumeyer | 111/85 |
| 4,530,405 A | 7/1985 | White | 172/126 |
| 4,537,262 A | 8/1985 | van der Lely | 172/146 |
| 4,538,688 A | 9/1985 | Szucs et al. | 172/555 |
| 4,550,122 A | 10/1985 | David et al. | 172/158 |
| 4,553,607 A | 11/1985 | Behn et al. | 172/156 |
| 4,580,506 A | 4/1986 | Fleischer et al. | 111/7 |
| 4,596,200 A | 6/1986 | Gafford et al. | 111/85 |
| 4,603,746 A | 8/1986 | Swales | 172/559 |
| 4,604,906 A | 8/1986 | Scarpa | 73/861.74 |
| 4,630,773 A | 12/1986 | Ortlip | 239/1 |
| 4,643,043 A | 2/1987 | Furuta et al. | 74/503 |
| 4,646,620 A | 3/1987 | Buchl | 91/1 |
| 4,650,005 A | 3/1987 | Tebben | 172/430 |
| 4,669,550 A | 6/1987 | Sittre | 172/559 |
| 4,671,193 A | 6/1987 | States | 111/73 |
| 4,674,578 A | 6/1987 | Bexten et al. | 172/126 |
| 4,703,809 A | 11/1987 | Van den Ende | 172/147 |
| 4,726,304 A | 2/1988 | Dreyer et al. | 111/73 |
| 4,738,461 A | 4/1988 | Stephenson et al. | 280/400 |
| 4,744,316 A | 5/1988 | Lienemann et al. | 111/69 |
| 4,762,075 A | 8/1988 | Halford | 111/73 |
| 4,765,190 A | 8/1988 | Strubbe | 73/861.72 |
| 4,768,387 A | 9/1988 | Kemp et al. | 73/861.73 |
| 4,779,684 A | 10/1988 | Schultz | 171/62 |
| 4,785,890 A | 11/1988 | Martin | 172/29 |
| 4,825,957 A | 5/1989 | White et al. | 172/126 |
| 4,825,959 A | 5/1989 | Wilhelm | 172/720 |
| 4,920,901 A | 5/1990 | Pounds | 111/164 |
| 4,926,767 A | 5/1990 | Thomas | 111/187 |

(56) References Cited

U.S. PATENT DOCUMENTS

| | | | | |
|---|---|---|---|---|
| 4,930,431 | A | 6/1990 | Alexander | 111/164 |
| 4,986,367 | A | 1/1991 | Kinzenbaw | 172/126 |
| 4,998,488 | A | 3/1991 | Hansson | 111/187 |
| 5,015,997 | A | 5/1991 | Strubbe | 340/684 |
| 5,027,525 | A | 7/1991 | Haukaas | 33/624 |
| 5,033,397 | A | 7/1991 | Colburn, Jr. | 111/118 |
| 5,065,632 | A | 11/1991 | Reuter | 73/861.73 |
| 5,074,227 | A | 12/1991 | Schwitters | 111/137 |
| 5,076,180 | A | 12/1991 | Schneider | 111/139 |
| 5,092,255 | A | 3/1992 | Long et al. | 111/167 |
| 5,113,957 | A | 5/1992 | Tamai et al. | 172/10 |
| 5,129,282 | A | 7/1992 | Bassett et al. | 74/529 |
| 5,136,934 | A | 8/1992 | Darby, Jr. | 100/125 |
| 5,190,112 | A | 3/1993 | Johnston et al. | 172/245 |
| 5,234,060 | A | 8/1993 | Carter | 172/413 |
| 5,240,080 | A | 8/1993 | Bassett et al. | 172/740 |
| 5,255,617 | A | 10/1993 | Williams et al. | 111/140 |
| 5,269,237 | A | 12/1993 | Baker et al. | 111/121 |
| 5,282,389 | A | 2/1994 | Faivre et al. | 73/861.73 |
| 5,285,854 | A | 2/1994 | Thacker et al. | 172/176 |
| 5,333,694 | A | 8/1994 | Roggenbuck et al. | 172/156 |
| 5,337,832 | A | 8/1994 | Bassett | 172/504 |
| 5,341,754 | A | 8/1994 | Winterton | 111/139 |
| 5,346,019 | A | 9/1994 | Kinzenbaw et al. | 172/311 |
| 5,346,020 | A | 9/1994 | Bassett | 172/540 |
| 5,349,911 | A | 9/1994 | Holst et al. | 111/139 |
| 5,351,635 | A | 10/1994 | Hulicsko | 111/135 |
| 5,379,847 | A | 1/1995 | Snyder | 172/128 |
| 5,394,946 | A | 3/1995 | Clifton et al. | 172/139 |
| 5,398,771 | A | 3/1995 | Hornung et al. | 172/311 |
| 5,419,402 | A | 5/1995 | Heintzman | 172/551 |
| 5,427,192 | A | 6/1995 | Stephenson et al. | 180/53.1 |
| 5,443,023 | A | 8/1995 | Carroll | 111/191 |
| 5,443,125 | A | 8/1995 | Clark et al. | 172/608 |
| 5,461,995 | A | 10/1995 | Winterton | 111/139 |
| 5,462,124 | A | 10/1995 | Rawson | 172/569 |
| 5,473,999 | A | 12/1995 | Rawson et al. | 111/127 |
| 5,477,682 | A | 12/1995 | Tobiasz | 60/583 |
| 5,477,792 | A | 12/1995 | Bassett et al. | 111/121 |
| 5,479,868 | A | 1/1996 | Bassett | 111/139 |
| 5,479,992 | A | 1/1996 | Bassett | 172/4 |
| 5,485,796 | A | 1/1996 | Bassett | 111/33 |
| 5,485,886 | A | 1/1996 | Bassett | 172/763 |
| 5,497,717 | A | 3/1996 | Martin | 111/191 |
| 5,497,837 | A | 3/1996 | Kehrney | 172/619 |
| 5,499,683 | A | 3/1996 | Bassett | 172/4 |
| 5,499,685 | A | 3/1996 | Downing, Jr. | 172/699 |
| 5,517,932 | A | 5/1996 | Ott et al. | 111/193 |
| 5,524,525 | A | 6/1996 | Nikkel et al. | 91/179 |
| 5,531,171 | A | 7/1996 | Whitesel et al. | 111/139 |
| 5,542,362 | A | 8/1996 | Bassett | 111/120 |
| 5,544,709 | A | 8/1996 | Lowe et al. | 172/661 |
| 5,562,165 | A | 10/1996 | Janelle et al. | 172/4 |
| 5,590,611 | A | 1/1997 | Smith | 111/127 |
| 5,603,269 | A | 2/1997 | Bassett | 111/52 |
| 5,623,997 | A | 4/1997 | Rawson et al. | 172/156 |
| 5,640,914 | A | 6/1997 | Rawson | 111/140 |
| 5,657,707 | A | 8/1997 | Dresher et al. | 111/139 |
| 5,660,126 | A | 8/1997 | Freed et al. | 111/140 |
| 5,685,245 | A | 11/1997 | Bassett | 111/62 |
| 5,704,430 | A | 1/1998 | Smith et al. | 172/29 |
| 5,709,271 | A | 1/1998 | Bassett | 172/4 |
| 5,727,638 | A | 3/1998 | Wodrich et al. | 172/414 |
| 5,852,982 | A | 12/1998 | Peter | 111/118 |
| 5,868,207 | A | 2/1999 | Langbakk et al. | 172/274 |
| 5,878,678 | A | 3/1999 | Stephens et al. | 111/139 |
| RE36,243 | E | 7/1999 | Rawson et al. | 111/121 |
| 5,970,891 | A | 10/1999 | Schlagel | 111/135 |
| 5,970,892 | A | 10/1999 | Wendling et al. | 111/139 |
| 5,988,293 | A | 11/1999 | Brueggen et al. | 172/414 |
| 6,067,918 | A | 5/2000 | Kirby | 111/121 |
| 6,164,385 | A | 12/2000 | Buchl | 172/239 |
| 6,223,663 | B1 | 5/2001 | Wendling et al. | 111/139 |
| 6,223,828 | B1 | 5/2001 | Paulson et al. | 171/63 |
| 6,237,696 | B1 | 5/2001 | Mayerle | 172/558 |
| 6,253,692 | B1 | 7/2001 | Wendling et al. | 111/139 |
| 6,314,897 | B1 | 11/2001 | Hagny | 111/192 |
| 6,325,156 | B1 | 12/2001 | Barry | 172/518 |
| 6,330,922 | B1 | 12/2001 | King | 172/166 |
| 6,331,142 | B1 | 12/2001 | Bischoff | 460/112 |
| 6,343,661 | B1 | 2/2002 | Thompson et al. | 172/444 |
| 6,347,594 | B1 | 2/2002 | Wendling et al. | 111/167 |
| 6,382,326 | B1 | 5/2002 | Goins et al. | 172/239 |
| 6,389,999 | B1 | 5/2002 | Duello | 111/200 |
| 6,453,832 | B1 | 9/2002 | Schaffert | 111/150 |
| 6,454,019 | B1 | 9/2002 | Prairie et al. | 172/677 |
| 6,460,623 | B1 | 10/2002 | Knussman et al. | 172/4 |
| 6,516,595 | B2 | 2/2003 | Rhody et al. | 56/10.2 E |
| 6,530,334 | B2 | 3/2003 | Hagny | 111/189 |
| 6,575,104 | B2 | 6/2003 | Brummelhuis | 111/139 |
| 6,644,224 | B1 | 11/2003 | Bassett | 111/157 |
| 6,701,856 | B1 | 3/2004 | Zoke et al. | 111/121 |
| 6,701,857 | B1 | 3/2004 | Jensen et al. | 111/200 |
| 6,786,130 | B2 | 9/2004 | Steinlage et al. | 91/390 |
| 6,834,598 | B2 | 12/2004 | Jüptner | 111/140 |
| 6,840,853 | B2 | 1/2005 | Foth | 460/111 |
| 6,886,650 | B2 | 5/2005 | Bremmer | 180/89.13 |
| 6,889,943 | B2 | 5/2005 | Dinh et al. | 248/34 |
| 6,912,963 | B2 | 7/2005 | Bassett | 111/163 |
| 6,986,313 | B2 | 1/2006 | Halford et al. | 111/186 |
| 6,997,400 | B1 | 2/2006 | Hanna et al. | 239/383 |
| 7,004,090 | B2 | 2/2006 | Swanson | 111/119 |
| 7,044,070 | B2 | 5/2006 | Kaster et al. | 111/62 |
| 7,063,167 | B1 | 6/2006 | Staszak et al. | 172/328 |
| 7,159,523 | B2 | 1/2007 | Bourgault et al. | 111/187 |
| 7,222,575 | B2 | 5/2007 | Bassett | 111/140 |
| 7,290,491 | B2 | 11/2007 | Summach et al. | 111/181 |
| 7,360,494 | B2 | 4/2008 | Martin | 111/164 |
| 7,360,495 | B2 | 4/2008 | Martin | 111/164 |
| 7,438,006 | B2 | 10/2008 | Mariman et al. | 111/164 |
| 7,451,712 | B2 | 11/2008 | Bassett et al. | 111/140 |
| 7,523,709 | B1 | 4/2009 | Kiest | 111/119 |
| 7,540,333 | B2 | 6/2009 | Bettin et al. | 172/744 |
| 7,575,066 | B2 | 8/2009 | Bauer | 172/540 |
| 7,584,707 | B2 | 9/2009 | Sauder et al. | 111/140 |
| 7,665,539 | B2 | 2/2010 | Bassett et al. | 172/540 |
| 7,673,570 | B1 | 3/2010 | Bassett | 111/63 |
| 7,743,718 | B2 | 6/2010 | Bassett | 111/135 |
| 7,870,827 | B2 | 1/2011 | Bassett | 111/119 |
| 7,938,074 | B2 | 5/2011 | Liu | 111/200 |
| 7,946,231 | B2 | 5/2011 | Martin et al. | 111/60 |
| 8,146,519 | B2 | 4/2012 | Bassett | 111/119 |
| 8,151,717 | B2 | 4/2012 | Bassett | 111/135 |
| 8,327,780 | B2 | 12/2012 | Bassett | 111/119 |
| 8,359,988 | B2 | 1/2013 | Bassett | 111/135 |
| 8,380,356 | B1 | 2/2013 | Zielke et al. | 700/284 |
| 8,386,137 | B2 | 2/2013 | Sauder et al. | 701/50 |
| 8,393,407 | B2 | 3/2013 | Freed | 172/551 |
| 8,408,149 | B2 | 4/2013 | Rylander | 111/140 |
| 8,550,020 | B2 | 10/2013 | Sauder et al. | 111/200 |
| 8,573,319 | B1 | 11/2013 | Casper et al. | 172/4 |
| 8,634,992 | B2 | 1/2014 | Sauder et al. | 701/50 |
| 2002/0162492 | A1 | 11/2002 | Juptner | 111/140 |
| 2006/0102058 | A1 | 5/2006 | Swanson | 111/119 |
| 2006/0191695 | A1 | 8/2006 | Walker et al. | 172/452 |
| 2006/0237203 | A1 | 10/2006 | Miskin | 172/799.5 |
| 2007/0044694 | A1 | 3/2007 | Martin | 111/121 |
| 2007/0272134 | A1 | 11/2007 | Baker et al. | 111/163 |
| 2008/0093093 | A1 | 4/2008 | Sheppard et al. | 172/2 |
| 2008/0236461 | A1 | 10/2008 | Sauder et al. | 111/170 |
| 2008/0256916 | A1 | 10/2008 | Vaske et al. | 56/13.5 |
| 2010/0019471 | A1 | 1/2010 | Ruckle et al. | 280/504 |
| 2010/0108336 | A1 | 5/2010 | Thomson et al. | 172/795 |
| 2010/0180695 | A1 | 7/2010 | Sauder et al. | 73/862.045 |
| 2010/0198529 | A1 | 8/2010 | Sauder et al. | 702/41 |
| 2010/0282480 | A1 | 11/2010 | Breker et al. | 172/170 |
| 2011/0247537 | A1 | 10/2011 | Freed | 111/140 |
| 2011/0313575 | A1 | 12/2011 | Kowalchuk et al. | 700/282 |
| 2012/0060730 | A1 | 3/2012 | Bassett | 111/149 |
| 2012/0060731 | A1 | 3/2012 | Bassett | 111/149 |
| 2012/0167809 | A1 | 7/2012 | Bassett | 111/119 |
| 2012/0186216 | A1 | 7/2012 | Vaske et al. | 56/367 |
| 2012/0210920 | A1 | 8/2012 | Bassett | 111/140 |
| 2012/0216731 | A1 | 8/2012 | Schilling et al. | 111/69 |

(56) References Cited

U.S. PATENT DOCUMENTS

| | | | |
|---|---|---|---|
| 2012/0232691 A1 | 9/2012 | Green et al. | 700/231 |
| 2012/0255475 A1 | 10/2012 | Mariman et al. | 111/149 |
| 2012/0305274 A1 | 12/2012 | Bassett | 172/5 |
| 2013/0032363 A1 | 2/2013 | Curry et al. | 172/4 |
| 2013/0112121 A1 | 5/2013 | Achen et al. | 111/14 |
| 2013/0112124 A1 | 5/2013 | Bergen et al. | 111/151 |
| 2013/0133904 A1 | 5/2013 | Bassett | 172/239 |
| 2013/0146318 A1 | 6/2013 | Bassett | 172/5 |
| 2013/0192186 A1 | 8/2013 | Bassett | 56/10.2 E |
| 2013/0199808 A1 | 8/2013 | Bassett | 172/260.5 |
| 2013/0213676 A1 | 8/2013 | Bassett | |
| 2014/0026748 A1 | 1/2014 | Stoller et al. | 91/418 |
| 2014/0034339 A1 | 2/2014 | Sauder et al. | 172/2 |
| 2014/0034343 A1 | 2/2014 | Sauder et al. | 172/664 |

FOREIGN PATENT DOCUMENTS

| | | | |
|---|---|---|---|
| DE | 335464 | 9/1921 | |
| DE | 1108971 | 6/1961 | |
| DE | 24 02 411 | 7/1975 | E01C 23/08 |
| EP | 2 497 348 A1 | 9/2012 | A01B 79/00 |
| GB | 1 574 412 | 9/1980 | 111/123 |
| GB | 2 056 238 A | 10/1982 | |
| JP | 54-57726 | 5/1979 | 74/529 |
| SU | 392897 | 8/1973 | |
| SU | 436778 | 7/1974 | |
| SU | 611201 | 6/1978 | 74/527 |
| SU | 625648 | 9/1978 | |
| SU | 1410884 A1 | 7/1988 | |
| SU | 1466674 | 3/1989 | 111/124 |
| WO | WO 2011/161140 A1 | 12/2011 | A01C 7/20 |
| WO | WO 2012/149367 A1 | 1/2012 | A01C 5/00 |
| WO | WO 2012/149415 A1 | 1/2012 | A01B 63/111 |
| WO | WO 2012/167244 A1 | 12/2012 | A01B 5/00 |
| WO | WO 2013/025898 A1 | 2/2013 | B60C 23/02 |

OTHER PUBLICATIONS

Martin Industries, LLC Paired 13" Spading Closing Wheels Brochure, date estimated as early as Jun. 6, 2012, pp. 18-25 (8 pages).

Vogt, Willie, "*Revisiting Robotics*," http://m.farmindustrynews.com/farm-equipment/revisiting-robotics, Dec. 19, 2013 (3 pages).

John Deere, New Semi-Active Sea Suspension, http://www.deere.com/en_US/parts/agparts/semiactiveseat.html, date estimated as early as Jan. 2014, retrieved Feb. 6, 2014 (2 pages).

Case Corporation Brochure, Planters 900 Series Units/Modules Product Information, Aug. 1986 (4 pages).

Buffalo Farm Equipment All Flex Cultivator Operator Manual, Apr. 1990 (7 pages).

Shivvers, Moisture Trac 3000 Brochure, Aug. 21, 1990 (5 pages).

The New Farm, "*New Efficiencies in Nitrogen Application*," Feb. 1991, p. 6 (1 page).

Hiniker Company, Flow & Acreage Continuous Tracking System Monitor Demonstration Manuel, date estimated as early as Feb. 1991 (7 pages).

Russnogle, John, "*Sky Spy: Gulf War Technology Pinpoints Field and Yields*," Top Producer, A Farm Journal Publication, Nov. 1991, pp. 12-14 (4 pages).

Borgelt, Steven C., "*Sensor Technologies and Control Strategies for Managing Variability*," University of Missouri, Apr. 14-16, 1992 (15 pages).

Buffalo Farm Equipment Catalog on Models 4600, 4630, 4640, and 4620, date estimated as early as Feb. 1992 (4 pages).

Hiniker 5000 Cultivator Brochure, date estimated as early as Feb. 1992 (4 pages).

Hiniker Series 5000 Row Cultivator Rigid and Folding Toolbar Operator's Manual, date estimated as early as Feb. 1992 (5 pages).

Orthman Manufacturing, Inc., Rowcrop Cultivator Booklet, date estimated as early as Feb. 1992 (4 pages).

Yetter Catalog, date estimated as early as Feb. 1992 (4 pages).

Exner, Rick, "*Sustainable Agriculture: Practical Farmers of Iowa Reducing Weed Pressure in Ridge-Till*," Iowa State University University Extension, http://www.extension.iastate.edu/Publications/SA2.pdf, Jul. 1992, Reviewed Jul. 2009, Retrieved Nov. 2, 2012 (4 pages).

Finck, Charlene, "*Listen to Your Soil*," Farm Journal Article, Jan. 1993, pp. 14-15 (2 pages).

Acu-Grain, "*Combine Yield Monitor 99% Accurate? 'You Bet Your Bushels!!*'" date estimated as early as Feb. 1993 (2 pages).

John Deere, New 4435 Hydro Row-Crop and Small-Grain Combine, date estimated as early as Feb. 1993 (8 pages).

Vansichen, R. et al., "*Continuous Wheat Yield Measurement on a Combine*," date estimated as early as Feb. 1993 (5 pages).

Yetter 2010 Product Catalog, date estimated as early as Jan. 2010 (2 pages).

Yetter Cut and Move Manual, Sep. 2010 (28 pages).

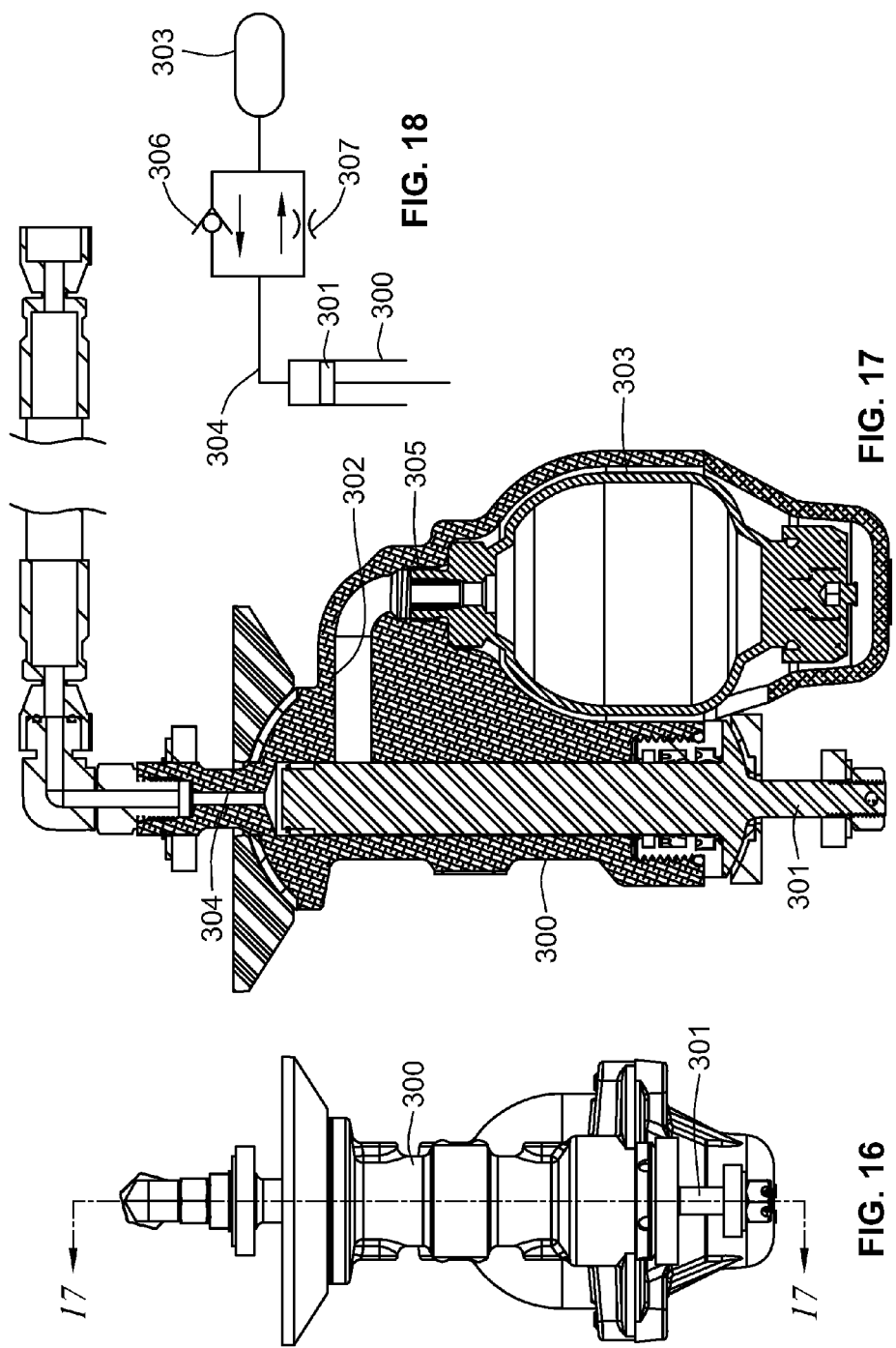

ROW UNIT FOR AGRICULTURAL IMPLEMENT

CROSS-REFERENCE TO RELATED APPLICATION

This application is a continuation of U.S. patent application Ser. No. 13/075,574, titled "Hydraulic Down Pressure Control System For Closing Wheels Of An Agricultural Implement" and filed Mar. 30, 2011, which is a continuation-in-part of U.S. patent application Ser. No. 12/882,627, titled "Row Unit For Agricultural Implement" and filed Sep. 15, 2010, each of which is incorporated herein in its entirety.

FIELD OF THE INVENTION

The present invention relates to agricultural implements and, more particularly, to an agricultural row unit for use with agricultural implements such as planting row units.

BACKGROUND OF THE INVENTION

As an agricultural planter row unit travels across fields with variable soil types, soil moisture, residue levels and topography, it is difficult to maintain constant seed depth and other parameters due to changing conditions which would ideally require varying the row unit down force pressure. For example, farming with higher residue levels also requires higher row unit down force levels as row cleaners, coulters and other attachments require applied force to keep them in the ground and at consistent depths.

At the same time, in many locations there are immoveable rocks or other obstructions at or below the soil surface which require the planter row unit to be able to quickly and freely (without undue increase in the row unit down force) rise up and over the obstruction freely and then quickly move back down, leaving a minimum amount of the row unplanted. All this must be accomplished at ground speeds of 6 mph or more. Today's planters typically include many individual row units, at times up to 120 ft wide, each of which may be encountering rocks etc. or have a need to float up or down independently.

Traditionally springs have been used to urge row units downward. Recently air bag systems have been used to overcome some of the drawbacks to air spring systems. Air systems provide a more uniform down force through the vertical range of travel, compared to springs, and are somewhat easier to adjust than springs. However due to the compressibility of air and the relatively large volumes required, changes in air pressure are very cumbersome and not adaptable to very fast change and response to in-cab controls on the go. Air bag systems typically have a very large cross-sectional area in relation to the hose feeding the air spring with pressure, which can provide a large multiplication of force and allow for relatively good isolation of one row unit relative to another. However, air bag systems typically do not allow for rapid change of the force being applied, because of the large volume of the air spring in relation to the cross section of the hose supplying the air.

Prior attempts to use devices such as combination spring/hydraulic shock absorbers do not provide ready adjustment on the go and tend to increase in force when rapidly striking a foreign object such as a rock requiring the row unit to quickly rise and come back down to resume planting. This increase in force levels can cause damage to the planter row unit components.

Some previous down-force systems use a spring and a hydraulic cylinder in series. In these systems the hydraulic cylinder does not directly control row unit down force, but rather is used to vary the amount of spring pressure applied to each unit.

Other systems use hydraulics with a central accumulator. However, with the accumulator separated from the force creating cylinder, pressure spikes can develop when hitting obstructions such as a rock at high speed since oil must be forced through hoses or tubes to the remotely located accumulator. This is especially problematic on planters having 50 or more row units.

As computers and GPS systems have allowed crop production to be managed in a location-specific way as an implement moves through the field, it has become necessary to achieve more rapid changes in the setting or adjustment of the implement. In the case of a planter row unit, it is also necessary to generate a large amount of force. Each individual planter row unit must be able to react to the soil it encounters independently of the other row units.

An air spring can allow for remote adjustment of the planter down pressure without stopping the forward motion of the implement, which is inefficient. Mechanical springs have historically required that the operator stop the implement, get out of the tractor, and make a manual adjustment. The slow rate at which an air spring system can be inflated or deflated means that even if a GPS system determines that a change needs to be made because of a programmed or sensed change in the local soil composition or conditions, by the time the pump can change the air pressure the implement has already moved too far forward of where the change needed to be made. This forces the average grid size in which active adjustments of the planter down pressure can be made to be quite large.

SUMMARY OF THE INVENTION

In one embodiment, an agricultural row unit for use with a towing frame hitched to a tractor includes an attachment frame adapted to be rigidly connected to the towing frame. A support member is pivotably coupled to the attachment frame to permit vertical pivoting movement of the support member relative to the attachment frame, and at least one furrow-closing device is mounted on the support member. A hydraulic cylinder is coupled to the support member for urging the row unit frame downwardly toward the soil. The hydraulic cylinder includes a movable ram extending into the cylinder, and a hydraulic-fluid cavity within the cylinder for receiving pressurized hydraulic fluid for urging the ram in a first direction that pivots the support member in a first vertical direction. An accumulator has a fluid chamber containing a pressurized gas for urging the ram in a second direction that pivots the support member in a second vertical direction.

In one implementation, a single unitary housing forms the hydraulic cylinder and the fluid chamber. The hydraulic-fluid cavity is on one side of the ram, and the fluid chamber may be on the other side of the ram.

In another embodiment, a hydraulic unit for controlling the down pressure on an agricultural implement includes an accumulator coupled to the hydraulic cylinder for receiving a portion of the hydraulic fluid from the cylinder in response to movement of the ram in a second direction that pivots the support member downwardly. The accumulator has a fluid chamber containing a pressurized gas that opposes the pressure of the hydraulic fluid. A restriction in the coupling of the accumulator to the hydraulic cylinder damps the flow of the hydraulic fluid from the cylinder to the accumulator in response to movement of the ram in the second direction by an applied force, and a check valve in the coupling of the accumulator to the hydraulic cylinder permits substantially unrestricted flow of the hydraulic fluid from the accumulator to the cylinder when the applied force is removed or reduced.

BRIEF DESCRIPTION OF THE DRAWINGS

The invention may best be understood by reference to the following description taken in conjunction with the accompanying drawings, in which:

FIG. 16 is a side elevation of another modified embodiment of a hydraulic control unit;

FIG. 17 is an enlarged section taken along the line 17-17 in FIG. 16; and

FIG. 18 is a schematic diagram of the hydraulic circuit in the unit of FIGS. 16 and 17.

DETAILED DESCRIPTION OF ILLUSTRATED EMBODIMENTS

Figure 1:
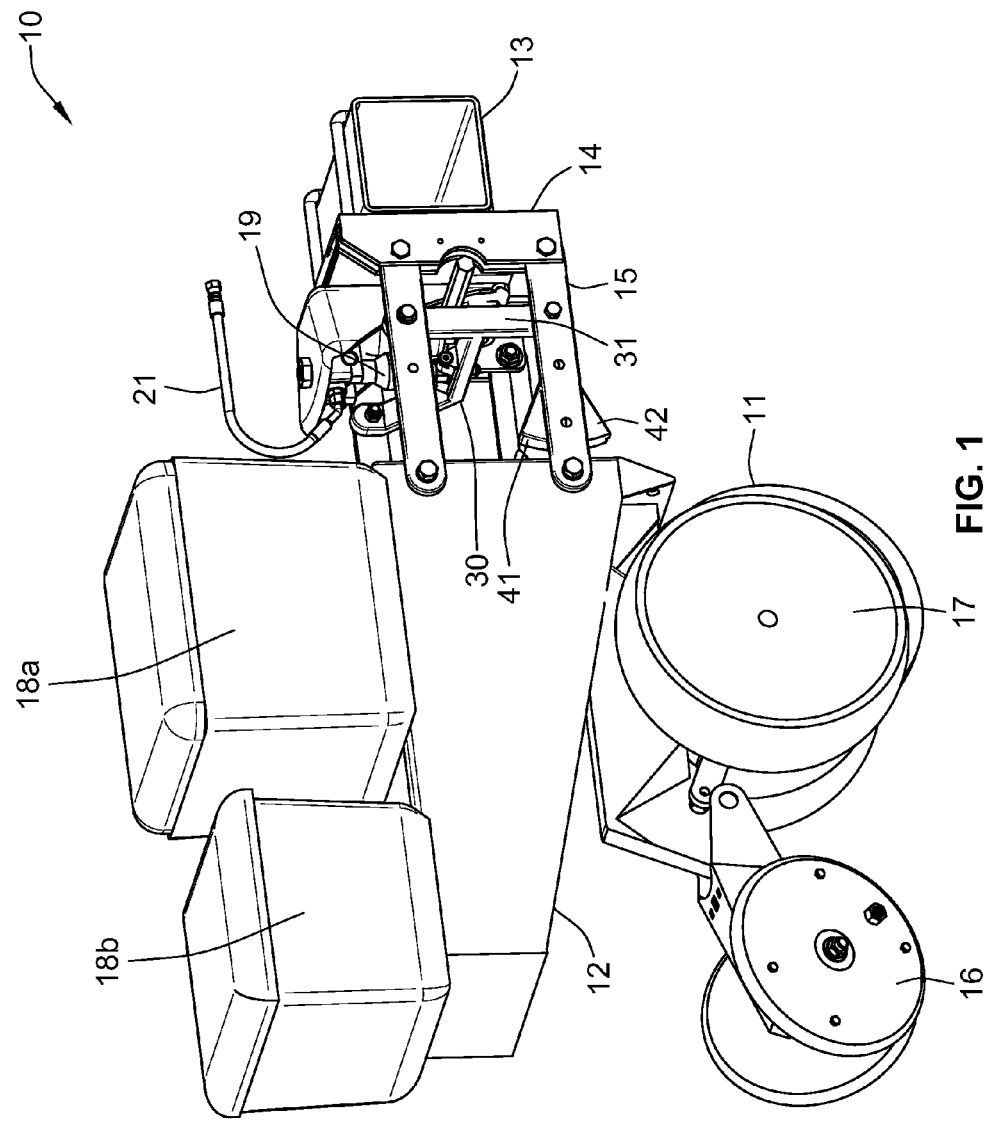
FIG. 1 is a perspective view of a planting row unit attached to a towing frame.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Turning now to the drawings, a planting row unit 10 includes a furrow-opening device for the purpose of planting seed or injecting fertilizer into the soil. In the illustrated embodiment, the furrow-opening device is a V-opener 11 formed by a pair of conventional tilted discs depending from the leading end of a row unit frame 12. It will be understood that other furrow-opening devices may be used. A conventional elongated hollow towing frame 13 (typically hitched to a tractor by a draw bar) is rigidly attached to the front frame 14 of a conventional four-bar linkage assembly 15 that is part of the row unit 10. The four-bar (sometimes referred to as "parallel-bar") linkage assembly 15 is a conventional and well known linkage used in agricultural implements to permit the raising and lowering of tools attached thereto.

As the planting row unit 10 is advanced by the tractor, the V-opener 11 penetrates the soil to form a furrow or seed slot. Other portions of the row unit 10 then deposit seed in the seed slot and fertilizer adjacent to the seed slot, and close the seed slot by distributing loosened soil into the seed slot with a pair of closing wheels 16. A gauge wheel 17 determines the planting depth for the seed and the height of introduction of fertilizer, etc. Bins 18a and 18b on the row unit carry the chemicals and seed which are directed into the soil. The planting row unit 10 is urged downwardly against the soil by its own weight, and, in addition, a hydraulic cylinder 19 is coupled between the front frame 14 and the linkage assembly 15 to urge the row unit 11 downwardly with a controllable force that can be adjusted for different soil conditions. The hydraulic cylinder 19 may also be used to lift the row unit off the ground for transport by a heavier, stronger, fixed-height frame that is also used to transport large quantities of fertilizer for application via multiple row units.

Figure 4:
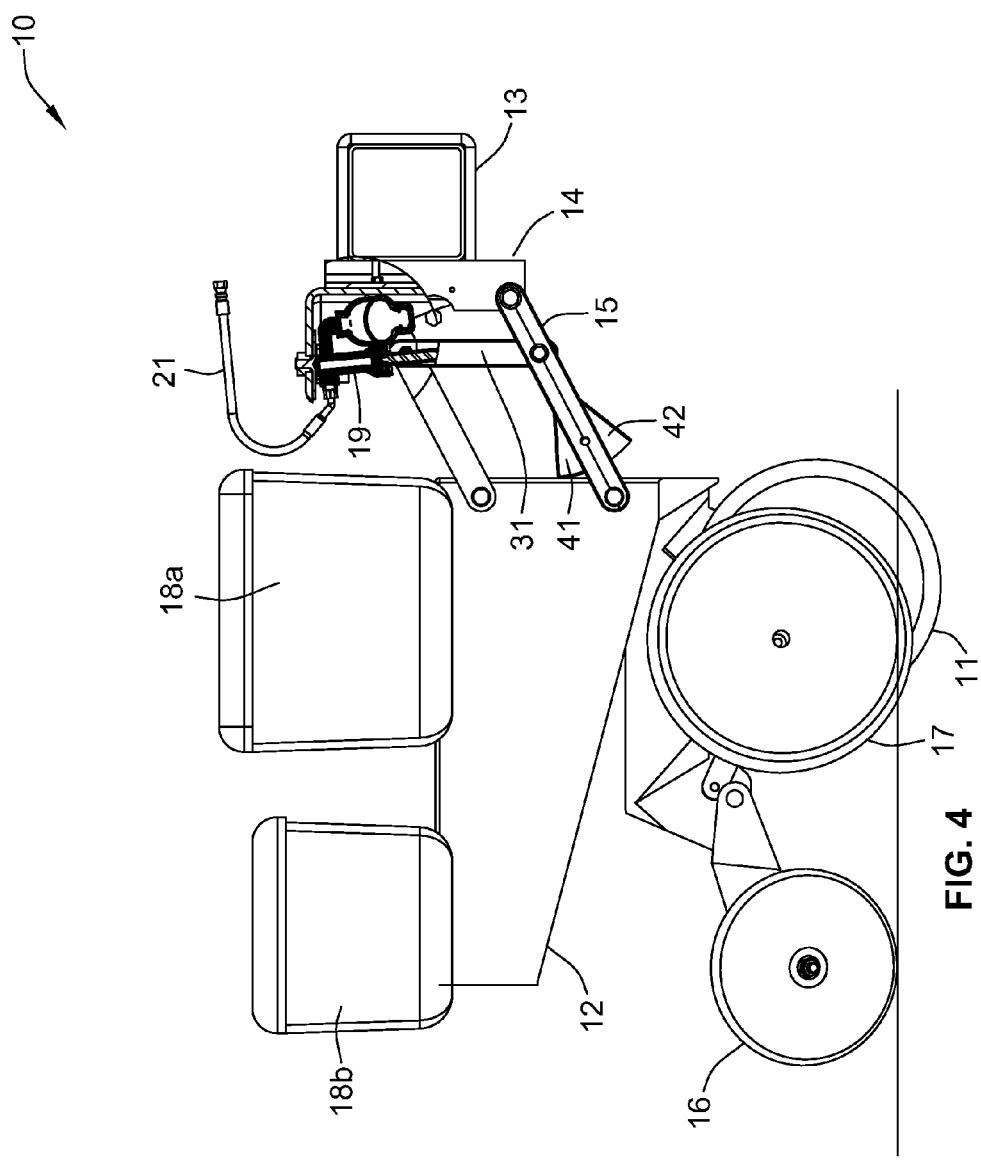
FIG. 4 is the same side elevation shown in FIG. 1 but with the linkage tilted downwardly to move the row unit to a lowered position.
Figure 5:
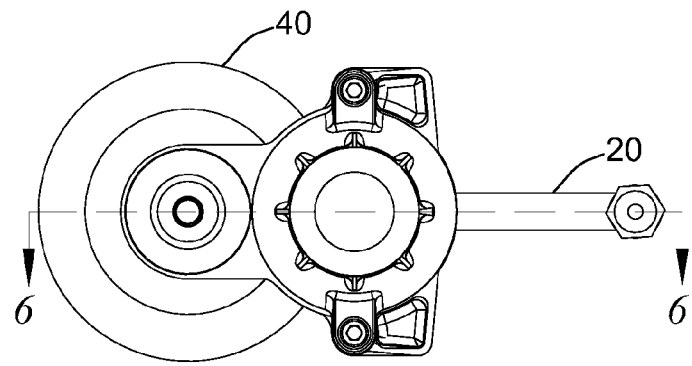
FIG. 5 is a top plan view of the hydraulic cylinder and accumulator unit included in the row unit of FIGS. 1-4.
Figure 6:
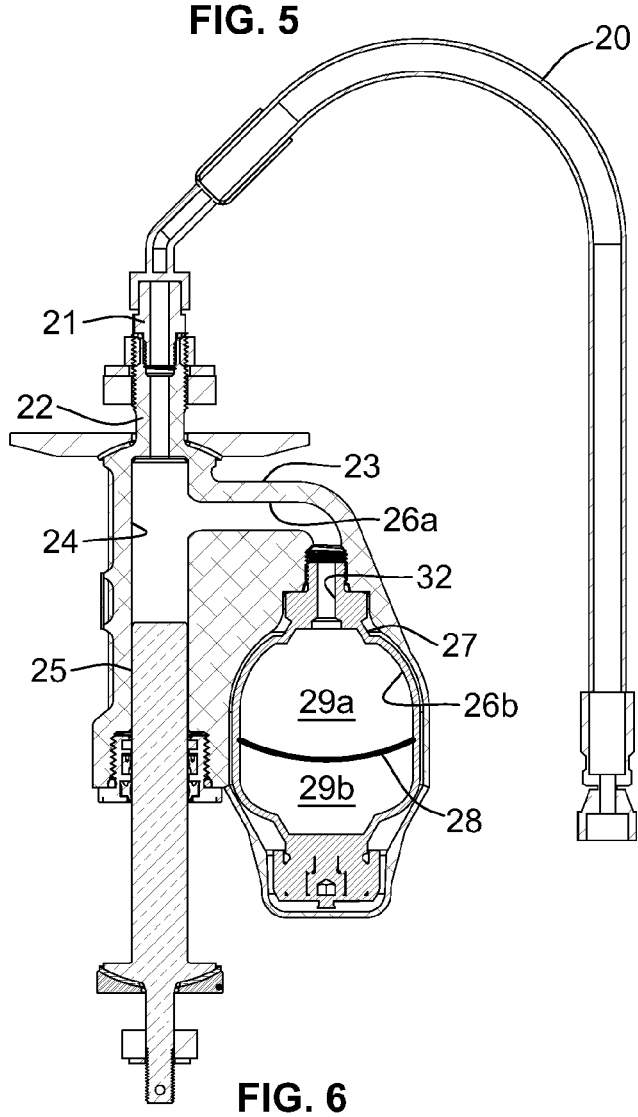
FIG. 6 is a vertical section taken along line 11-11 in FIG. 10.

The hydraulic cylinder 19 is shown in more detail in FIGS. 5 and 6. Pressurized hydraulic fluid from the tractor is supplied by a hose 20 to a port 21 that leads into a matching port 22 of a housing 23 that forms a cavity 24 of a hydraulic cylinder containing a ram 25. The housing 23 also forms a side port 26a that leads into cavity 26b that contains a gas-charged hydraulic accumulator 27. The lower end of the cavity 24 is formed by the top end surface of the ram 25, so that the hydraulic pressure exerted by the hydraulic fluid on the end surface of the ram 25 urges the ram downwardly (as viewed in FIG. 6), with a force determined by the pressure of the hydraulic fluid and the area of the exposed end surface of the ram 25. The hydraulic fluid thus urges the ram 25 in an advancing direction (see FIG. 4).

Figure 3:
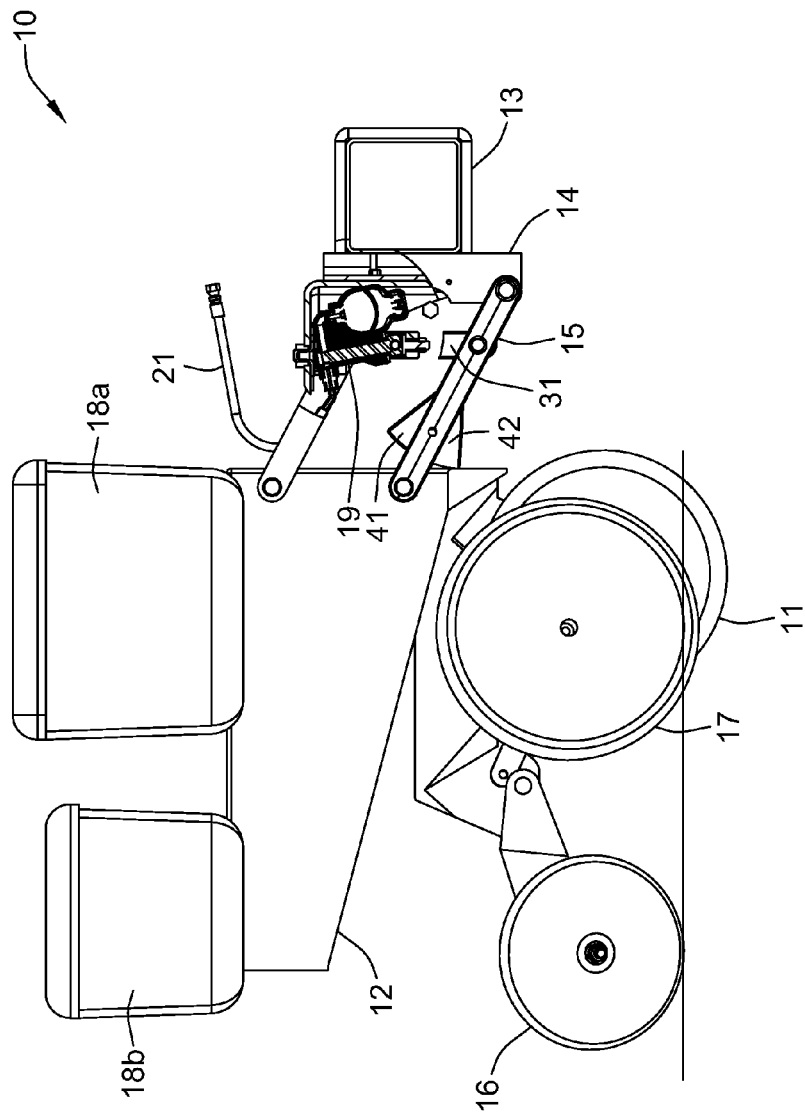
FIG. 3 is the same side elevation shown in FIG. 1 but with the linkage tilted upwardly to move the row unit to a raised position.
Figure 9:
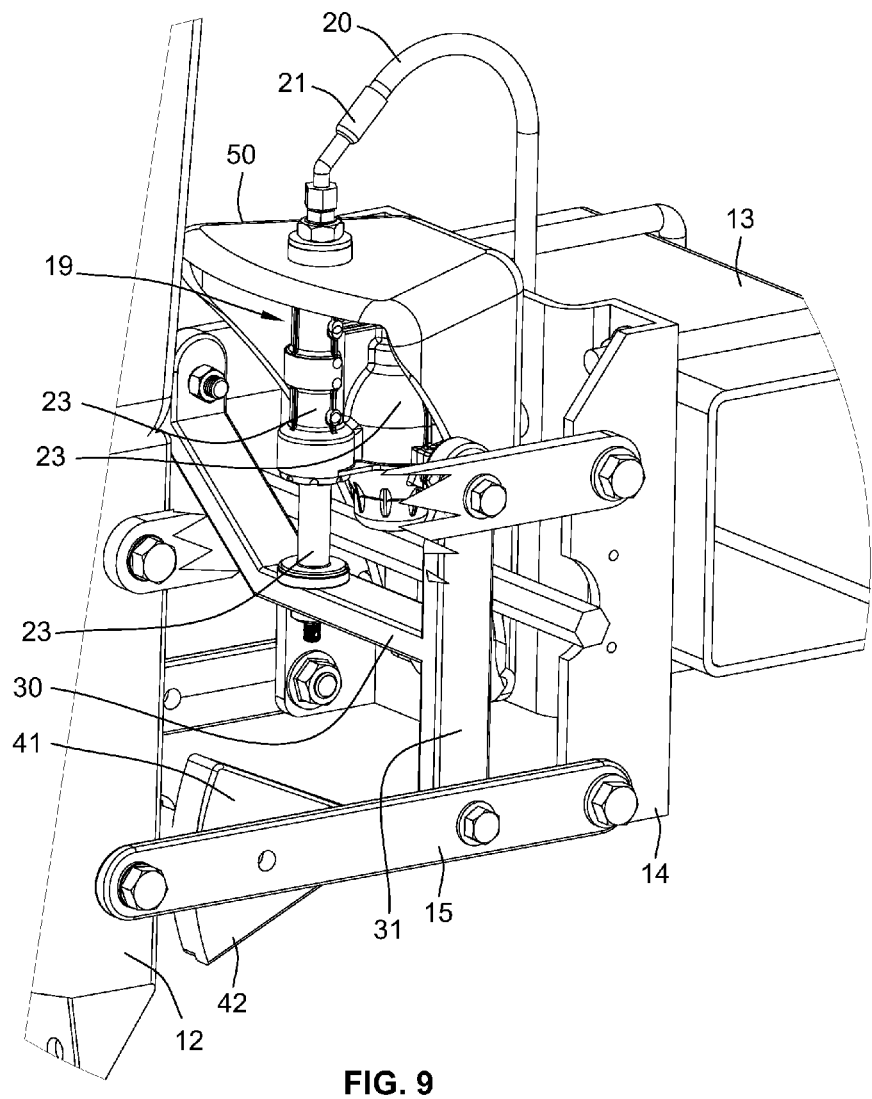
FIG. 9 is an enlarged perspective of the right-hand end portion of FIG. 1 with a portion of the four-bar linkage broken away to reveal the mounting of the hydraulic cylinder/accumulator unit.

As can be seen most clearly in FIG. 9, the hydraulic cylinder 19 and the accumulator 27 are mounted as a single unit on the front frame 14, with the lower end of the ram 25 connected to a cross bar 30 that is joined at one end to a vertical link 31. The upper and lower ends of the link 31 are pivotably attached to upper and lower links 15a and 15b, respectively, on one side of the four-bar linkage 15. The other end of the cross bar 30 is angled upwardly and pivotably attached to the upper link 15c on the opposite side of the four-bar linkage 15. With this mounting arrangement, retracting movement of the ram 25 into the cavity 24 tilts the linkage assembly 15 upwardly, as depicted in FIG. 3, thereby raising the row unit. Conversely, advancing movement of the ram 25 tilts the linkage assembly 15 downwardly, as depicted in FIG. 4, thereby lowering the row unit.

Figure 2:
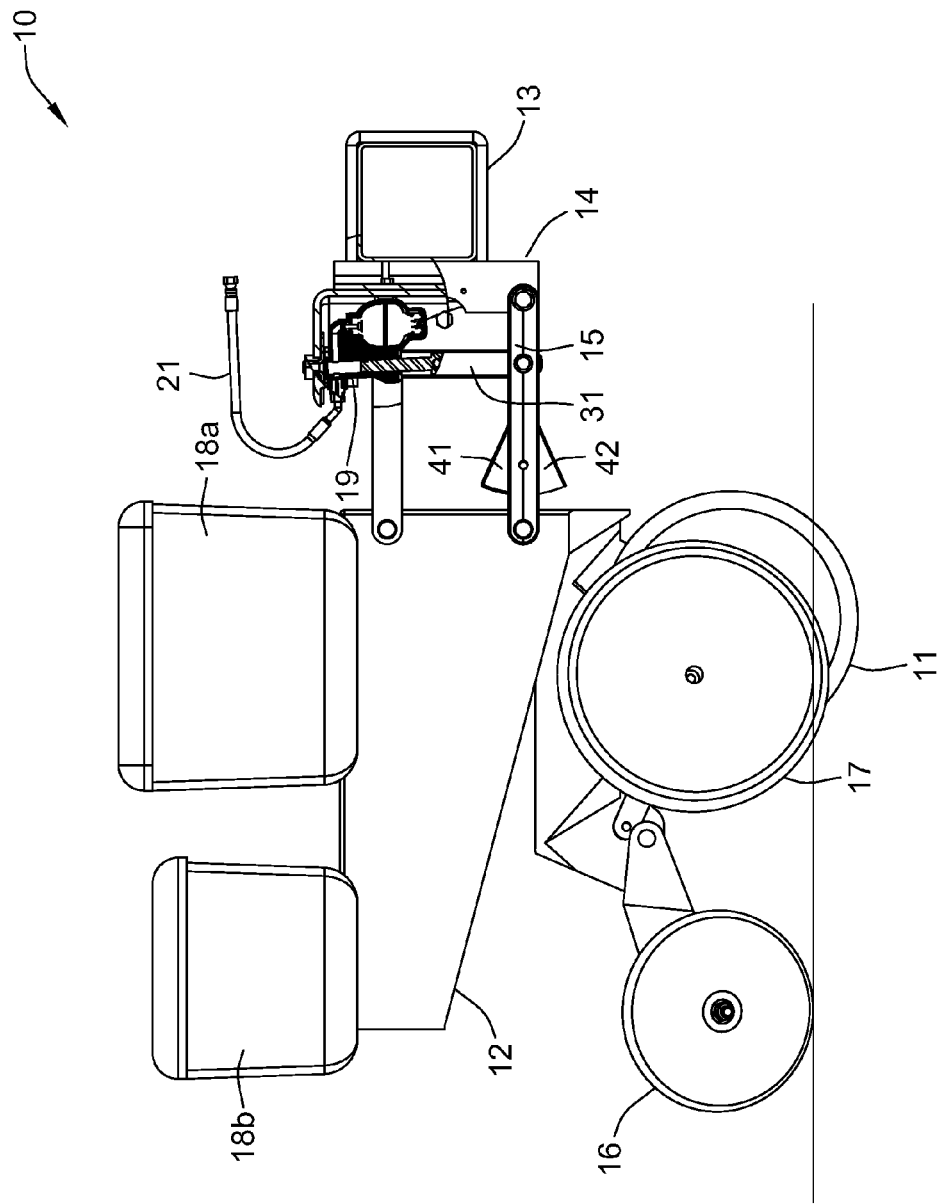
FIG. 2 is a partially sectioned side elevation of the planting row unit of FIG. 1 with the linkage that connects the row unit to the towing frame in a level position.

The accumulator 27 includes a diaphragm 28 that divides the interior of the accumulator into a hydraulic-fluid chamber 29a and a gas-filled chamber 29b, e.g., filled with pressurized nitrogen. FIG. 2 shows the ram 25 in a position where the diaphragm 28 is not deflected in either direction, indicating that the pressures exerted on opposite sides of the diaphragm are substantially equal. In FIG. 3, the ram 25 has been retracted by upward movement of the row unit, and the diaphragm 28 is deflected downwardly by the hydraulic fluid forced into the accumulator 27 by the retracting movement of the ram 25. In FIG. 4, the ram 25 has been moved to its most advanced position, and the diaphragm 28 is deflected upwardly by the air pressure as hydraulic fluid flows from the accumulator into the cavity 24. The use of this compact hydraulic down-force unit with an integral accumulator on each row unit provides the advantages of quick response and remote adjustability of a hydraulic down-force control system. If an obstruction requires quick movement, oil can flow quickly and freely between the force cylinder and the adjacent accumulator.

As can be seen in FIG. 4, advancing movement of the ram 25 is limited by engagement of stops 40, 42 on the lower links of the four-bar linkage 15, with the row unit frame 12. This prevents any further advancement of the ram 25. Advancing movement of the ram 25 expands the size of the cavity 24 (see FIG. 4), which causes the diaphragm 28 in the accumulator 27 to deflect to the position illustrated in FIG. 4 and reduce the amount of hydraulic fluid in the accumulator 27. When the ram 25 is in this advanced position, the row unit is in its lowermost position.

In FIG. 3, the ram 25 has been withdrawn to its most retracted position, which can occur when the row unit encounters a rock or other obstruction, for example. When the ram 25 is in this retracted position, the row unit is in its uppermost position. As can be seen in FIG. 3, retracting movement of the ram 25 is limited by engagement of stops 40, 42 on the lower links of the four-bar linkage 15, with the row unit frame 12.

Retracting movement of the ram 25 reduces the volume of the cavity 24 (see FIG. 3), which causes a portion of the fixed volume of hydraulic fluid in the cylinder 19 to flow into the chamber 29a of the accumulator 27, causing the diaphragm 28 to deflect to the position illustrated in FIG. 3. This deflection of the diaphragm 28 into the chamber 29b compresses the gas in that chamber. To enter the chamber 29a, the hydraulic fluid must flow through a port 32 in the top of the accumulator 27, which limits the rate at which the hydraulic fluid flows into the accumulator. This controlled rate of flow of the hydraulic fluid has a damping effect on the rate at which the ram 25 retracts or advances, thereby avoiding sudden large movements of the moving parts of the row unit, including the V-opener 11.

When the external obstruction causing the row unit 10 to rise is cleared, the combined effects of the pressurized gas in the accumulator 27 on the diaphragm 28 and the pressure of the hydraulic fluid return the ram 25 to a lower position. This downward force on the V-opener 11 holds it in the soil and prevents uncontrolled bouncing of the V-opener 11 over irregular terrain. The downward force applied to the V-opener 11 can be adjusted by changing the pressure of the hydraulic fluid supplied to the cylinder 19.

As can be seen in FIGS. 5 and 6, the single unitary housing 23 forms both the cavity 26b that contains the accumulator 27 and the cavity 24 of the hydraulic cylinder 19 and the fluid passageway 24 that connects the cavity 24 of the hydraulic cylinder 19 to the cavity 27 of the accumulator. By integrating the hydraulic cylinder 19 and the accumulator 27 in a single housing, there is no relative motion possible between the cylinder 19 and the accumulator 27, with minimal possibility for fluid passageways to act like orifices. The cylinder 19 and the accumulator 27 remain in fixed positions relative to each other regardless of the movements of the planter row unit via the linkage assembly 15. In this way the upward motion of the ram 25 that occurs when the planter row unit rolls over an obstruction is directly converted into compression of the gas in the accumulator 27 without restriction. It also allows the accumulator 27, which is by definition an energy storage device, to be mounted in a fully enclosed and safe housing. The accumulator 27 can be securely mounted to avoid puncture or rapid discharge (if it comes loose), or damage from hitting another part of the implement or a foreign object. The integrated cylinder and accumulator is also a convenient single package for installation and replacement and minimizes the number of hydraulic hoses and adapters (potential leakage points).

Figures 7, 8A, 8B:
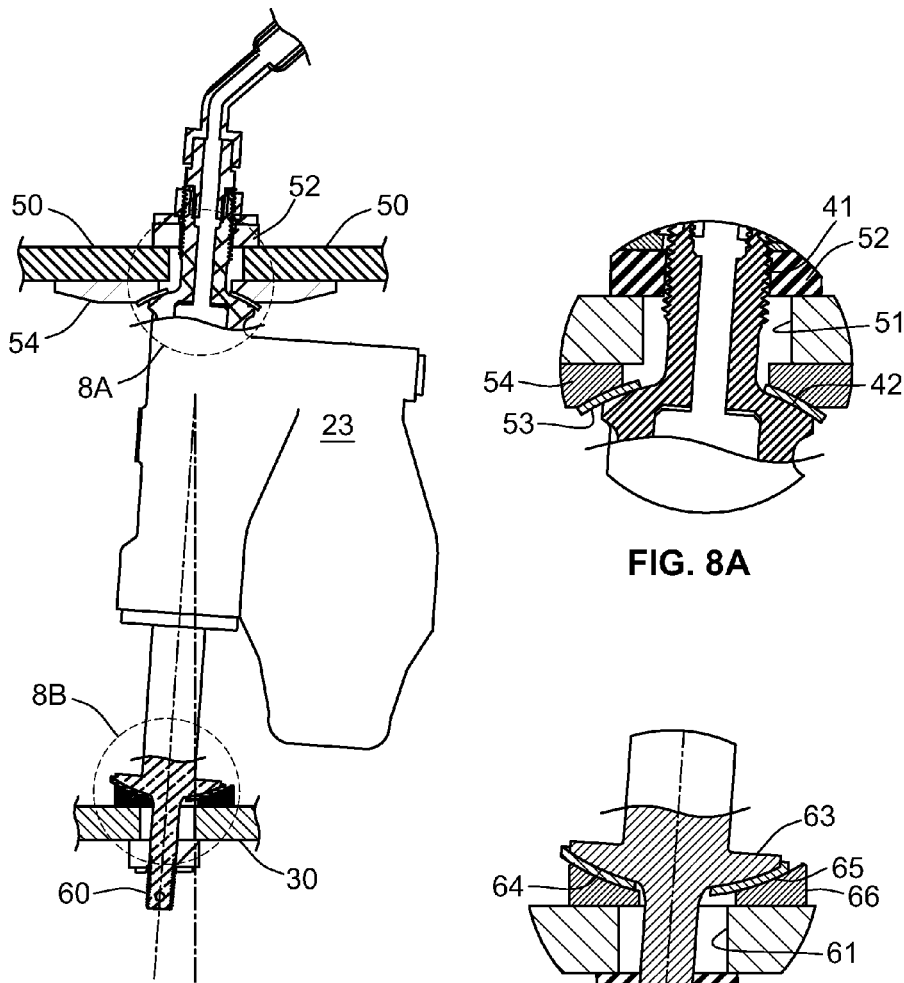
FIG. 7 is a side elevation of the unit shown in FIGS. 5 and 6 connected to a pair of supporting elements, with the support structures and the connecting portions of the hydraulic cylinder shown in section.
FIGS. 8A and 8B are enlarged cross sectional views of the supporting structures shown in section in FIG. 7.

FIGS. 7, 8A and 8B illustrate in more detail how the illustrative hydraulic cylinder/accumulator unit is attached to the front frame 14 and the linkage assembly 15. The top of the unitary housing 23 forms a stem 41 that projects upwardly through a hole 51 in a bracket 50 attached to the front frame 14. The outer surface of the stem 41 is threaded to receive a nut 52 that connects the housing 23 to the bracket 50. The hole 51 is oversized and a rubber washer is installed on the stem 41 between the nut 52 and the bracket 50 to allow a limited amount of tilting movement of the housing relative to the bracket 50. At the base of the stem 41, beneath the bracket 50, the housing 23 forms a shoulder 43 that engages a conical bearing ring 53 that also engages a mating lower surface of a washer 54. Thus, the housing 23 can be tilted relative to the axis of the hole 51, with the shoulder 43 sliding over the lower surface of the bearing ring 53.

A similar arrangement is provided at the lower end of the ram 25, where a stem 60 extends downwardly through a hole 61 in the cross bar 30 that is pivotably attached to the linkage assembly 15. A nut 62 is threaded onto the stem 60 to connect the ram to the cross bar 30. The hole 61 is oversized and a rubber washer is installed on the stem 60 between the nut 62 and the cross bar 30 to allow a limited amount of tilting movement of the ram 25 relative to the cross bar 30. Above the cross bar 30, a flange 63 on the ram 25 forms a curved conical surface 64 that engages a mating surface of a curved conical bearing ring 65 that also engages a mating upper surface of a washer 66. Thus, the ram 25 can be tilted relative to the axis of the hole 61, with the flange 63 sliding over the upper surface of the bearing ring 65.

The use of a hydraulic system permits on-the-go adjustments to be made very rapidly because the hydraulic fluid is incompressible and therefore acts more directly than an air system. In addition, hydraulic fluids typically operate at higher pressures, which allows greater changes in applied forces. The accumulator 27 allows the fluid system to flex and float with the changing terrain and soil conditions. The accumulator 27 is preferably centrally mounted so that when any single row unit moves over an obstruction, the down-pressure cylinder 19 moves to displace the hydraulic fluid along a common set of lines connecting all row units. The gas in the accumulator is compressed at the same time, allowing for isolation among the row units so that upward movement of one row unit does not cause downward movement of other row units. Although the illustrative hydraulic ram is single-acting, it is also possible to use a double-acting ram, or a single-acting ram in combination with a return spring.

Another advantage of the compact hydraulic cylinder/accumulator unit is that it can conveniently mounted to the same brackets that are provided in many row units for mounting an air bag, to control the down pressure on the row unit. For example, in FIG. 9, the brackets 50 and 51 on which the hydraulic cylinder/accumulator is mounted are the brackets that are often connected to an air bag, and thus the same row unit can be used interchangeably with either an air bag or the hydraulic cylinder/accumulator to control the down pressure on the row unit.

Figure 10:
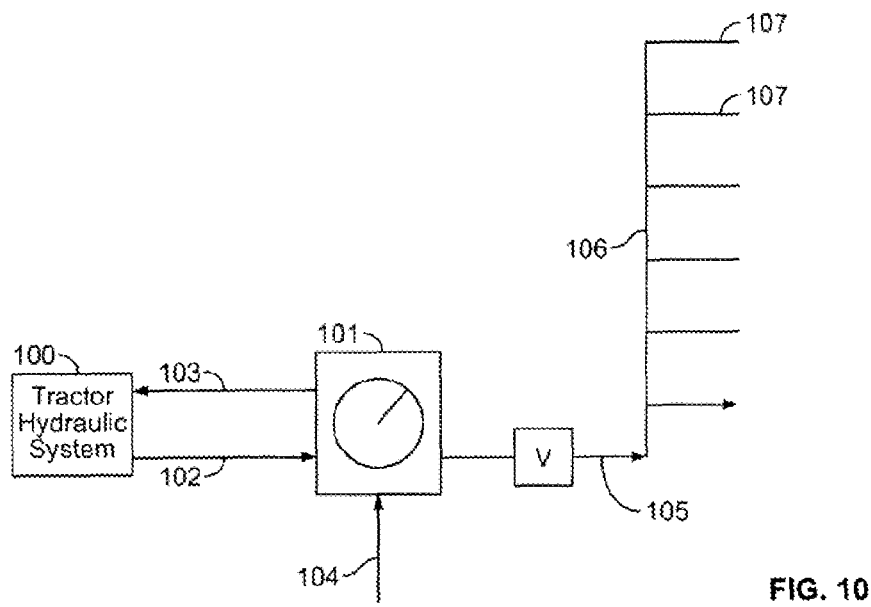
FIG. 10 is a schematic diagram of a first hydraulic control system for use with the row unit of FIGS. 1-9.

FIG. 10 is a schematic of a hydraulic control system for supplying pressurized hydraulic fluid to the cylinders 19 of multiple row units. A source 100 of pressurized hydraulic fluid, typically located on a tractor, supplies hydraulic fluid under pressure to a valve 101 via supply line 102 and receives returned fluid through a return line 103. The valve 101 can be set by an electrical control signal Si on line 104 to deliver hydraulic fluid to an output line 105 at a desired constant pressure. The output line is connected to a manifold 106 that in turn delivers the pressurized hydraulic fluid to individual feed lines 107 connected to the ports 21 of the respective hydraulic cylinders 19 of the individual row units. With this control system, the valve 101 is turned off, preferably by a manually controlled on/off valve V, after all the cylinders 19 have been filled with pressurized hydraulic fluid, to maintain a fixed volume of fluid in each cylinder.

Figure 11:
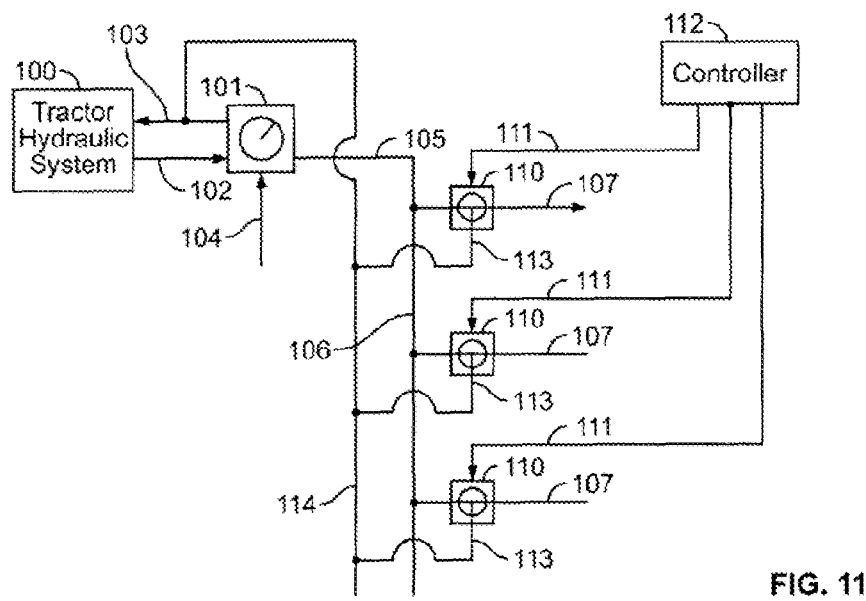
FIG. 11 is a schematic diagram of a second hydraulic control system for use with the row unit of FIGS. 1-9.

FIG. 11 is a schematic of a modified hydraulic control system that permits individual control of the supply of hydraulic fluid to the cylinder 19 of each separate row unit via feed lines 107 connected to the ports 21 of the respective cylinders 19. Portions of this system that are common to those of the system of FIG. 10 are identified by the same reference numbers. The difference in this system is that each separate feed line 107 leading to one of the row units is provided with a separate control valve 110 that receives its own separate control signal on a line 111 from a controller 112. This arrangement permits the supply of pressurized hydraulic fluid to each row unit to be turned off and on at different times by the separate valve 110 for each unit, with the times being controlled by the separate control signals supplied to the valves 110 by the controller 112. The individual valves 110 receive pressurized hydraulic fluid via the manifold 106, and return hydraulic fluid to a sump on the tractor via separate return line 113 connected to a return manifold 114 connected back to the hydraulic system 100 of the tractor.

Figure 12:
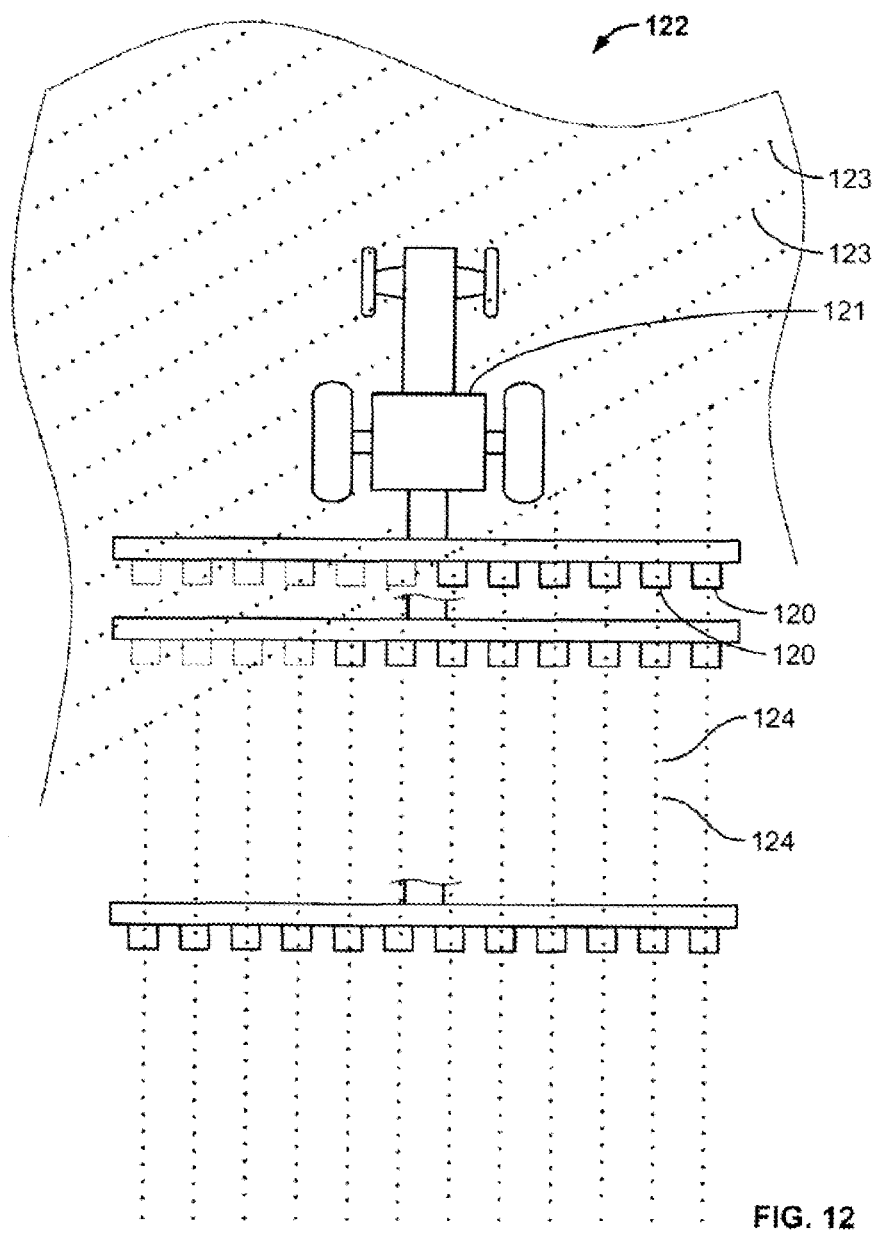
FIG. 12 is a diagram illustrating one application of the hydraulic control system of FIG. 11.

FIG. 12 illustrates on application for the controllable hydraulic control system of FIG. 11. Modern agricultural equipment often includes GPS systems that enable the user to know precisely where a tractor is located in real time. Thus, when a gang of planting row units 120 towed by a tractor 121 begins to cross a headland 122 in which the rows 123 are not orthogonal to the main rows 124 of a field, each planting row unit 120 can be turned off just as it enters the headland 122, to avoid double-planting while the tractor 121 makes a turn through the headland. With the control system of FIG. 11, the hydraulic cylinder 19 of each row unit can also be separately controlled to turn off the supply of pressurized hydraulic fluid at a different time for each row unit, so that each row unit is raised just as it enters the headland, to avoid disrupting the rows already planted in the headland.

One benefit of the system of FIG. 11 is that as agricultural planters, seeders, fertilizer applicators, tillage equipment and the like become wider with more row units on each frame, often 36 30-inch rows or 54 20-inch rows on a single 90-foot wide toolbar, each row unit can float vertically independently of every other row unit. Yet the following row units still have the down force remotely adjustable from the cab of the tractor or other selected location. This permits very efficient operation of a wide planter or other agricultural machine in varying terrain without having to stop to make manual adjustment to a large number of row units, resulting in a reduction in the number of acres planted in a given time period. One of the most important factors in obtaining a maximum crop yield is timely planting. By permitting remote down force adjustment of each row unit (or group of units), including the ability to quickly release all down force and let the row cleaner quickly rise, e.g., when approaching a wet spot in the field, one can significantly increase the planter productivity or acres planted per day, thereby improving yields and reducing costs of production.

On wide planters or other equipment, at times 90 feet wide or more and planting at 6 mph or more forward speed, one row unit must often rise or fall quickly to clear a rock or plant into an abrupt soil depression. Any resistance to quick movement results in either gouging of the soil or an uncleared portion of the field and reduced yield. With the row unit having its own hydraulic accumulator, the hydraulic cylinder can move quickly and with a nearly constant down force. Oil displaced by or required by quick movement of the ram is quickly moved into or out of the closely mounted accumulator which is an integral part of each row unit. The accumulator diaphragm or piston supplies or accepts fluid as required at a relatively constant pressure and down force as selected manually or automatically by the hydraulic control system. By following the soil profile closely and leaving a more uniform surface, the toolbar-frame-mounted row unit permits the planter row unit following independently behind to use less down force for its function, resulting in more uniform seed depth control and more uniform seedling emergence. More uniform seedling stands usually result in higher yields than less uniform seedling stands produced by planters with less accurate row cleaner ground following.

Figure 13:
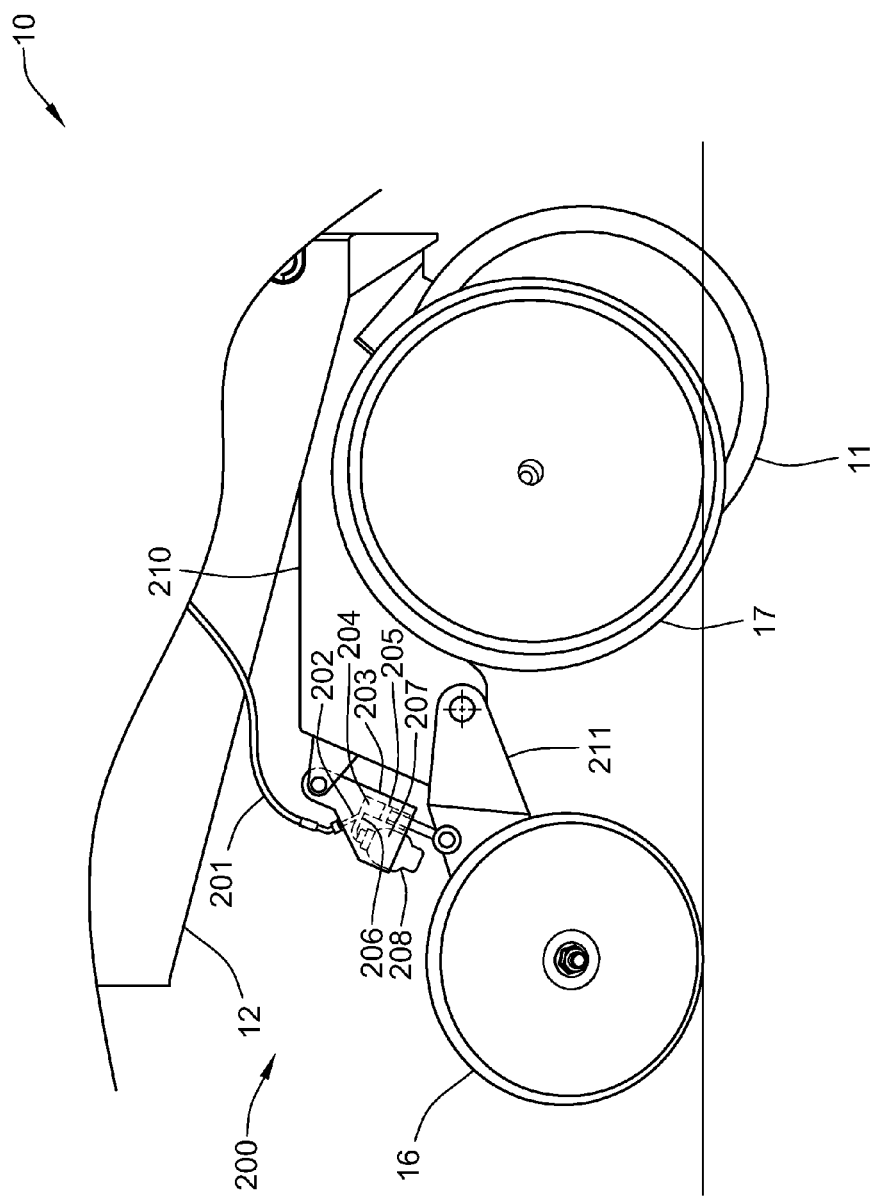
FIG. 13 is a side elevation of a modified embodiment having the hydraulic control unit coupled to the closing wheels of the row unit.
Figure 14:
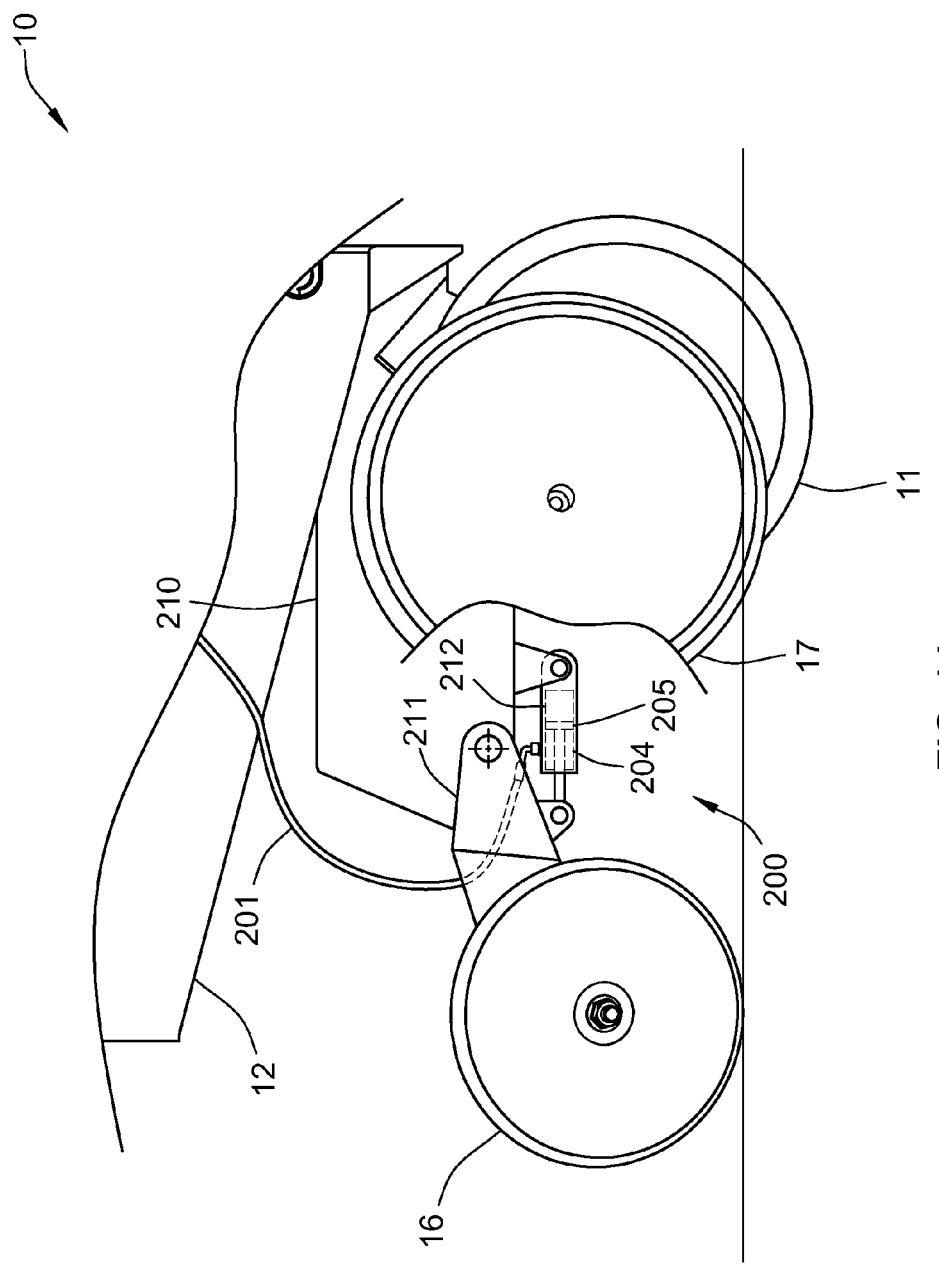
FIG. 14 is a side elevation of a further modified embodiment having the hydraulic control unit coupled to the closing wheels of the row unit.
Figure 15:
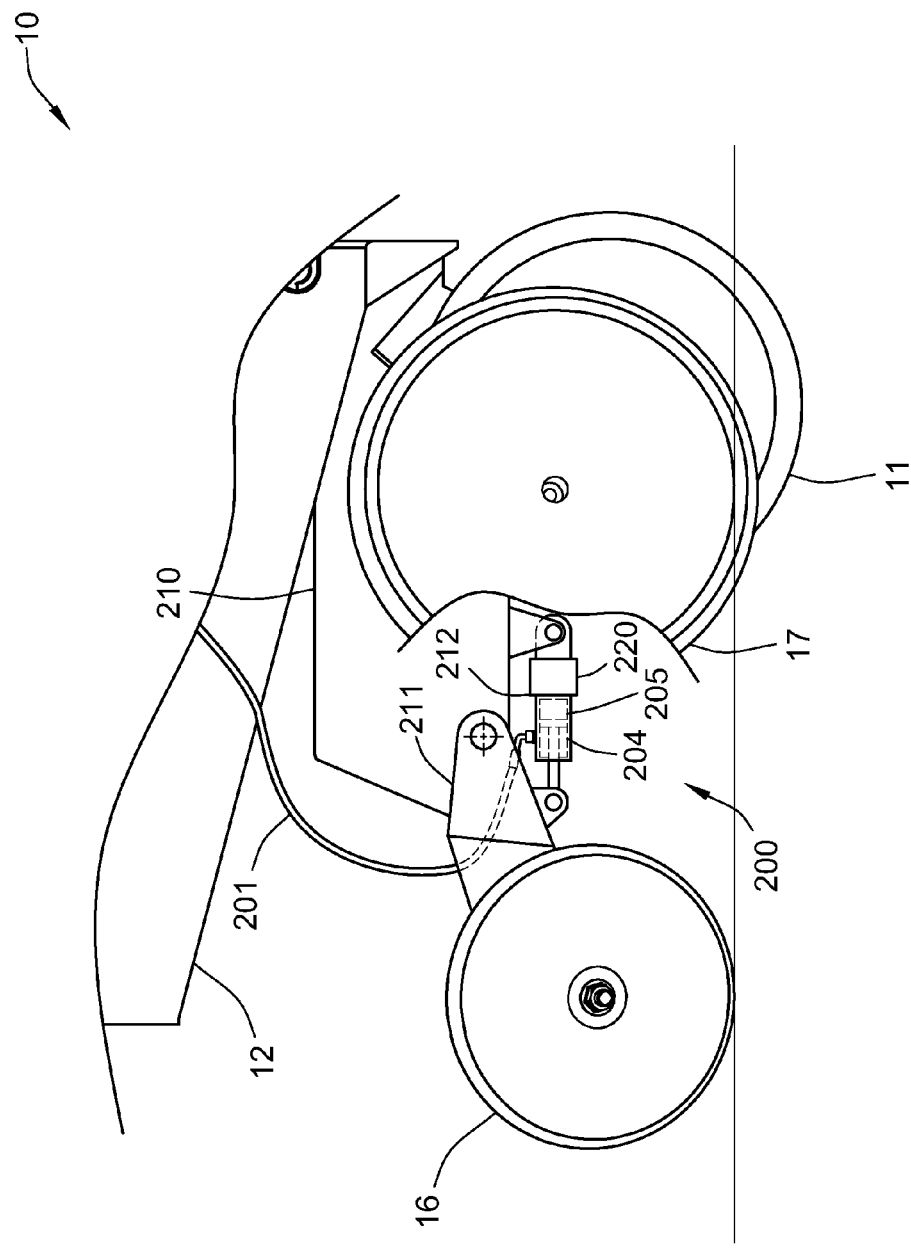
FIG. 15 is yet another modified embodiment having the hydraulic control unit coupled to the closing wheels of the row unit.

FIGS. 13-15 illustrate modified embodiments in which the hydraulic cylinder 200 urges the closing wheels 16 downwardly with a controllable force that can be adjusted for different conditions. Referring first to FIG. 13, pressurized hydraulic fluid from the tractor is supplied by a hose 201 to a port 202 of a housing 203 that forms a cavity of a hydraulic cylinder 204 containing a ram 205. The housing 203 also forms a side port 206 that leads into a cavity 207 that contains a gas-charged hydraulic accumulator 208. The lower end of the cavity 204 is formed by the top end surface of the ram 205, so that the hydraulic pressure exerted by the hydraulic fluid on the end surface of the ram 205 urges the ram downwardly (as viewed in FIG. 13), with a force determined by the pressure of the hydraulic fluid and the area of the exposed end surface of the ram 205. The hydraulic fluid thus urges the ram 205 in a downward direction.

The hydraulic cylinder 204 and the accumulator 208 are pivotably mounted as a single unit on the row unit frame 210, with the lower end of the ram 205 pivotably connected to a linkage 211 that carries the closing wheels 16. With this mounting arrangement, advancing movement of the ram 205 in the cylinder 204 tilts the linkage 211 downwardly, thereby urging the closing wheels 16 downwardly. Conversely, retracting movement of the ram 205 tilts the linkage 211 upwardly, thereby raising the closing wheels 16.

FIG. 14 illustrates an arrangement similar to FIG. 13 except that the hydraulic cylinder 204 is charged with a pressurized gas in chamber 212 on the side of the ram 205 that is not exposed to the pressurized fluid from the hose 201. Thus, as the ram 205 is retracted by increasing the hydraulic pressure on one side of the ram, the gas on the other side of the ram is compressed and thus increases the resistance to retracting movement of the ram. The hydraulic cylinder 204 is positioned such that advancing movement of the ram 205 in the cylinder 204 tilts the linkage 211 upwardly, thereby raising the closing wheels 16. Conversely, retracting movement of the ram 205 tilts the linkage 211 downwardly, thereby urging the closing wheels 16 downwardly with an increased force. To increase the downward pressure on the closing wheels 16, the hydraulic pressure must overcome the gas pressure that increases as the ram 205 is retracted, but upward movement of the closing wheels (e.g., when an obstruction is encountered) requires only that the ram be advanced with sufficient pressure to overcome that of the hydraulic fluid.

In FIG. 15, the arrangement is the same as in FIG. 14, but the hydraulic control unit has an added biasing element 220 on the side of the ram 205 that is not exposed to the pressurized hydraulic fluid. This biasing element 220 may be in addition to, or in place of, pressurized gas in the hydraulic cylinder 204. The biasing element 220 may be formed by various types of mechanical springs, such as a compressed coil spring, or may be pressurized air, nitrogen or other gas.

FIGS. 16-18 illustrate a modified hydraulic control unit that includes a hydraulic cylinder 300 containing a ram 301 that can be coupled at its lower end to a device on which the down pressure is to be controlled. Pressurized hydraulic fluid is supplied to the upper end of the cylinder 301 through a port 304. The cylinder 300 includes a side port 302 leading to an accumulator 303 of the type described above in connection with FIGS. 5 and 6. The entry port 305 to the accumulator 303 is equipped with a check valve 306 and restriction 307 as illustrated in FIG. 18. When the ram 301 is in a lowered position that opens the port 302, and is moved upwardly by an upward force applied by engagement of the controlled device with a rock or other obstruction, hydraulic fluid flows from the cylinder 300 into the accumulator 303 via the restriction 307. The restriction acts as a damper to reduce the shock on the equipment and avoid excessive upward movement of the ram 301. When the upward force on the ram has been removed, hydraulic fluid flows from the accumulator back into the cylinder 300 via the check valve 306, which allows unrestricted flow in this direction so that the controlled device quickly re-engages the ground with the down pressure exerted by the hydraulic fluid on the upper end of the ram 301. The check valve unit can be easily installed in the accumulator entry port 305.

The term row unit refers to a unit that is attached to a towing frame in a way that permits the unit to move vertically relative to the towing frame and other units attached to that same towing frame. Most row units are equipped to form, plant and close a single seed furrow, but row units are also made to form, plant and close two or more adjacent seed furrows.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural row unit, comprising:
    an attachment frame adapted to be rigidly connected to a towing frame hitched to a single tractor;
    a parallel-bar linkage pivotably coupled to the attachment frame;
    a row unit frame having a leading end pivotably coupled to the parallel-bar linkage to permit vertical pivoting movement of the row unit frame relative to the attachment frame;
    a closing wheel coupled to the row unit frame for distributing loosened soil into a furrow;
    a hydraulic cylinder coupled between the row unit frame and the closing wheel for urging the closing wheel with a controllable force that is adjusted for different soil conditions, the hydraulic cylinder including
        a movable ram having a first end and a second end, the first end being pivotably coupled to the closing wheel, and
        a hydraulic-fluid cavity for receiving pressurized hydraulic fluid, the hydraulic-fluid exerting hydraulic pressure on the second end of the movable ram for moving the ram in a direction that pivots the closing wheel downwardly toward the soil; and
    an energy storage device positioned adjacent to the hydraulic cylinder.

2. The agricultural row unit of claim 1, wherein advancing movement of the movable ram in the hydraulic-fluid cavity lowers the closing wheel downwardly towards the furrow.

3. The agricultural row unit of claim 1, wherein advancing movement of the movable ram in the hydraulic-fluid cavity raises the closing wheel upwardly away from the furrow.

4. The agricultural row unit of claim 1, wherein the energy storage device is a gas-charged hydraulic accumulator.

5. The agricultural row unit of claim 1, further comprising a housing mounted on the row unit frame and in which the hydraulic cylinder and the energy storage device are pivotably mounted as a single unit.

6. The agricultural row unit of claim 1, further comprising a closing-wheel linkage to which the closing wheel is mounted, the first end of the ram being pivotably connected to the closing-wheel linkage.

7. The agricultural row unit of claim 6, wherein advancing movement of the movable ram in the hydraulic-fluid cavity tilts the closing-wheel linkage downwardly, thereby urging the closing wheel downwardly towards the furrow, and retracting movement of the first end of the ram from the hydraulic-fluid cavity tilts the closing-wheel linkage upwardly, thereby raising the closing wheel upwardly away from the furrow.

8. The agricultural row unit of claim 6, wherein advancing movement of the movable ram in the hydraulic-fluid cavity tilts the closing-wheel linkage upwardly, thereby raising the closing wheel upwardly away from the furrow, and retracting movement of the first end of the ram from the hydraulic-fluid cavity tilts the closing-wheel linkage downwardly, thereby urging the closing wheel downwardly towards the furrow.

9. The agricultural row unit of claim 1, wherein the hydraulic cylinder further includes a chamber charged with a pressurized gas, the second end of the movable ram having a surface that separates the chamber from the hydraulic-fluid cavity, the pressurized gas increasing resistance to a retracting movement of the movable ram.

10. The agricultural row unit of claim 9, wherein the hydraulic cylinder further includes a biasing element in addition to the chamber with pressurized gas, the biasing element further increasing resistance to the retracting movement of the movable ram.

11. The agricultural row unit of claim 1, wherein the hydraulic cylinder further includes a biasing element, the second end of the movable ram having a surface that separates the biasing element from the hydraulic-fluid cavity, the biasing element increasing resistance to a retracting movement of the movable ram.

12. The agricultural row unit of claim 11, wherein the biasing element is a mechanical spring.

13. The agricultural row unit of claim 1, further comprising a control system coupled to and controllably adjusting a control valve to achieve the controllable force.

14. An agricultural row unit for use with a towing frame hitched to a tractor, the agricultural row unit comprising:
- an attachment frame adapted to be rigidly connected to the towing frame;
- a parallel-bar linkage pivotably coupled to the attachment frame;
- a row unit frame having a leading end pivotably coupled to the parallel-bar linkage to permit vertical pivoting movement of the row unit frame relative to the attachment frame;
- an opener device coupled to the row unit frame for forming a furrow;
- a closing-wheel linkage mounted to the row unit frame;
- a pair of closing wheels mounted to the closing-wheel linkage for distributing loosened soil into the furrow;
- a control valve coupled to a fluid supply source for receiving pressurized hydraulic fluid;
- a hydraulic cylinder mechanically coupled to both the row unit frame and the closing-wheel linkage, the hydraulic cylinder being in fluid communication with the control valve and including
  - a movable ram having a first end and a second end, the first end being pivotably coupled to the closing-wheel linkage such that movement of the movable ram moves the pair of closing wheels, and
  - a hydraulic-fluid cavity for receiving pressurized hydraulic fluid via the control valve, the hydraulic-fluid exerting hydraulic pressure on the second end of the movable ram for exerting a controllable force that pivots the closing wheels downwardly toward the soil; and
- a control system coupled to and controllably adjusting the control valve for adjusting the controllable force for different soil conditions.

15. The agricultural row unit of claim 14, further comprising an energy storage device positioned adjacent to the hydraulic cylinder.

16. The agricultural row unit of claim 15, further comprising a housing mounted on the row unit frame and in which the hydraulic cylinder and the energy storage device are pivotably mounted as a single unit.

17. The agricultural row unit of claim 14, wherein advancing movement of the movable ram in the hydraulic-fluid cavity lowers the closing wheels downwardly towards the furrow.

18. The agricultural row unit of claim 14, wherein advancing movement of the movable ram in the hydraulic-fluid cavity raises the closing wheels upwardly away from the furrow.

19. The agricultural row unit of claim 14, wherein the hydraulic cylinder further includes a chamber charged with a pressurized gas, the second end of the movable ram having a surface that separates the chamber from the hydraulic-fluid cavity, the pressurized gas increasing resistance to a retracting movement of the movable ram.

20. The agricultural row unit of claim 14, wherein the hydraulic cylinder further includes a biasing element, the second end of the movable ram having a surface that separates the biasing element from the hydraulic-fluid cavity, the biasing element increasing resistance to a retracting movement of the movable ram.

* * * * *